United States Patent
Bhattiprolu et al.

(10) Patent No.: US 9,477,729 B2
(45) Date of Patent: Oct. 25, 2016

(54) DOMAIN BASED KEYWORD SEARCH

(71) Applicant: Informatica LLC, Redwood City, CA (US)

(72) Inventors: Pradeep Bhattiprolu, Austin, TX (US); Richard Grondin, Sainte-Julie (CA)

(73) Assignee: Informatica LLC, Redwood City, CA (US)

( * ) Notice: Subject to any disclaimer, the term of this patent is extended or adjusted under 35 U.S.C. 154(b) by 0 days.

(21) Appl. No.: 14/274,573

(22) Filed: May 9, 2014

(65) Prior Publication Data
US 2014/0250119 A1 Sep. 4, 2014

Related U.S. Application Data

(63) Continuation-in-part of application No. 13/891,190, filed on May 9, 2013, now Pat. No. 8,886,617.

(51) Int. Cl.
*G06F 17/30* (2006.01)

(52) U.S. Cl.
CPC ..... *G06F 17/30566* (2013.01); *G06F 17/3053* (2013.01); *Y10S 707/99942* (2013.01); *Y10S 707/99943* (2013.01); *Y10S 707/99953* (2013.01)

(58) Field of Classification Search
None
See application file for complete search history.

(56) References Cited

U.S. PATENT DOCUMENTS 6,697,799 B1 * 2/2004 Neal et al.
7,809,570 B2 * 10/2010 Kennewick et al. ......... 704/257
2008/0077573 A1 * 3/2008 Weinberg .......... G06F 17/30495
2009/0254543 A1 * 10/2009 Ber .................. G06F 17/30675
2009/0265329 A1 10/2009 Korupolu et al.
2010/0010965 A1 * 1/2010 Edlund et al. .................... 707/3
2013/0254171 A1 9/2013 Grondin et al.

FOREIGN PATENT DOCUMENTS

EP 1566753 A2 8/2005

OTHER PUBLICATIONS

European Extended Search Report, European Application No. 15167201.1, Oct. 8, 2015, 10 pages.

* cited by examiner

*Primary Examiner* — Rehana Perveen
*Assistant Examiner* — Raheem Hoffler
(74) *Attorney, Agent, or Firm* — Marc S. Kaufman; Reed Smith LLP

(57) ABSTRACT

A database keyword search technique that relies on a domain based storage infrastructure is disclosed. In operation, a keyword search string is processed to generate a set of search string permutations. Each string permutation specifies a different ordering of one or more portions of the search string. A domain based search process is then executed asynchronously for each string permutation. Each execution generates a search result set that identifies rows in the database that include data relevant to the string permutation. The results in each result set are scored and ranked based in part on the similarity between the string permutation and the search string provided by the user. The rankings determine which of the results are to be presented to the user.

20 Claims, 18 Drawing Sheets

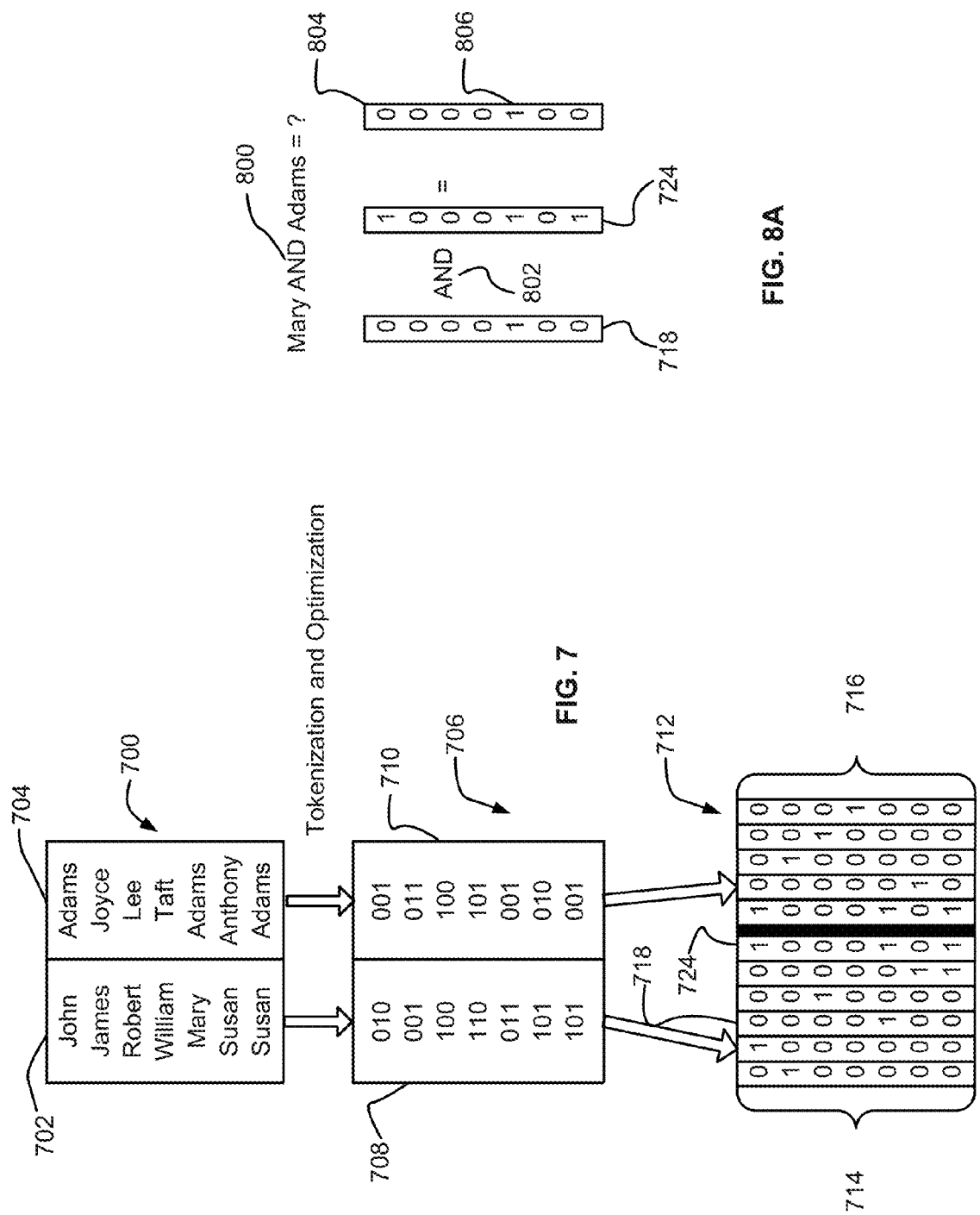

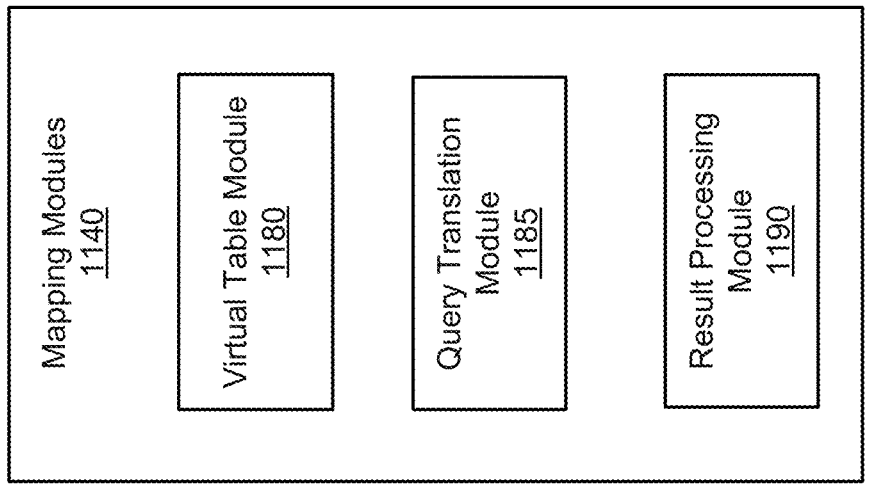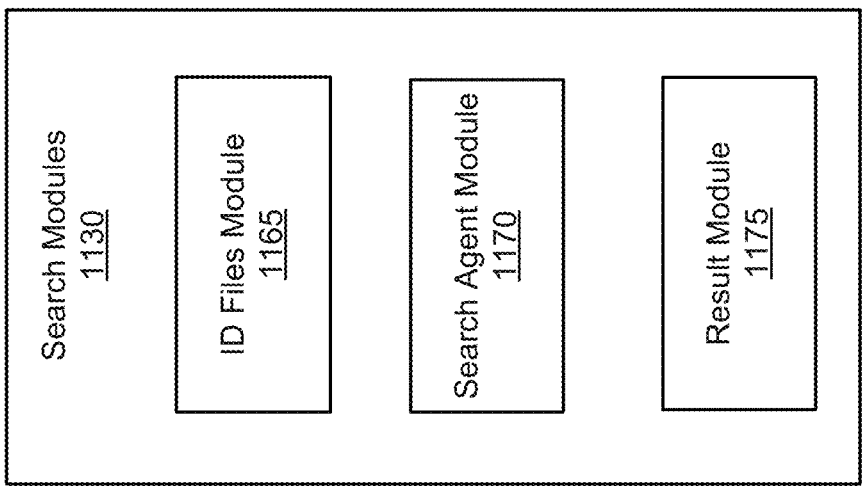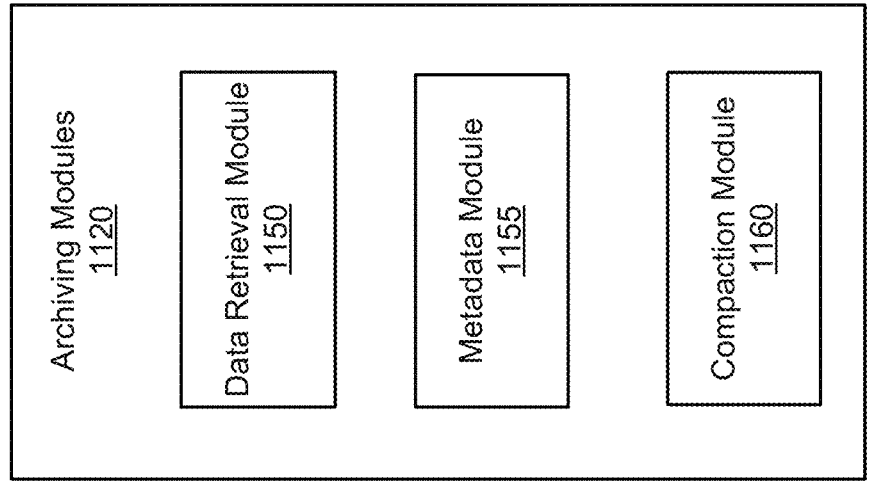
FIG. 11

T1

| URowID | C1 | C2 |
|---|---|---|
| 00023 | ABC10DEF23 | 11111111 |
| 00024 | ABC210DE11 | 00000010 |
| 00025 | ABCDEFGHIJ | 00100100 |

T2

| URowID | CC1 | CC2 |
|---|---|---|
| 00010 | ABC10DAB23 | A10BCD |
| 00011 | ABC222DE11 | ABCDEF |
| 00012 | ABCFFFGHIJ | ABCD10 |

T3

| URowID | CCC1 | CCC2 | CCC3 |
|---|---|---|---|
| 00111 | ABC23DEF23 | 00000010 | DDDD10 |
| 00112 | ABC213DE10 | 10101000 | DDEDED |
| 00113 | 123ABCDE11 | 01010101 | DECDEC |

FIG. 14

| Schema | Table | Column | URowID | Value |
|---|---|---|---|---|
| ABC | T1 | C1 | 00023 | ABC10DEF23 |
| ABC | T1 | C1 | 00024 | ABC210DE11 |
| ABC | T2 | CC1 | 00010 | ABC10DAB23 |
| XYZ | T3 | CCC1 | 00112 | ABC213DE10 |
| ABC | T1 | C2 | 00024 | 00000010 |
| XYZ | T3 | CCC2 | 00111 | 00000010 |
| ABC | T2 | CC2 | 00010 | A10BCD |
| ABC | T2 | CC2 | 00012 | ABCD10 |
| XYZ | T3 | CCC3 | 00111 | DDDD10 |

FIG. 15

DOMAIN BASED KEYWORD SEARCH

CROSS REFERENCE TO RELATED APPLICATIONS

This application is a continuation-in-part of U.S. patent application Ser. No. 13/891,190 filed on May 9, 2013, and is related to U.S. patent application Ser. No. 13/725,430 filed on Dec. 21, 2012, which is a continuation of U.S. patent application Ser. No.11/746,583 filed on May 9, 2007, now U.S. Pat. No. 8,386,435, issued Feb. 26, 2013, which is a divisional of U.S. patent application Ser. No. 10/783,643 filed Feb. 20, 2004, now U.S. Pat. No. 7,243,110, issued Jul. 10, 2007, the contents of which are herein incorporated by reference.

BACKGROUND

The present invention pertains generally to the field of database querying. Many business enterprises generate large amounts of electronic data that are archived for a variety of purposes. Examples include archiving transaction data for auditing, customer service or data mining uses. A business enterprise may also be required to archive electronic data for regulatory purposes.

The enterprise data typically is created and stored within one or more data warehouses spread out over multiple tables in a database or multiple databases. Searching these multiple sources typically requires that the data storage is built and indexed in full, at which point queries can be run against the data, often in a piecemeal format querying each column of the database. Thus, queries of all tables in a database or across database often requires knowledge of the underlying database structure, maintenance to keep tables in sync, pre-processing, and index building. In addition, queries using a typical model often require heavy processing and are redundant over data common between the tables. In the context of keyword searching, searches alternatively can be performed on documents, but this process requires data extraction and synchronization to ensure data integrity.

SUMMARY

A search orchestration engine is configured to receive a textual search string and orchestrate the execution of a keyword search on a database. Data in the database is represented by multiple compressed tokenized data segments. A tokenized data segment corresponds to one or more columns in a table within the database and includes, for each unique value in the designated column(s), a corresponding unique entity identifier. Upon receiving a search string, the search orchestration engine generates multiple string permutations related to the search string. Each string permutation is database agnostic, i.e., does not specify the tables or columns in the database that should be searched, and specifies a different permutation of one or more keywords included in the search string. For each string permutation, the search orchestration engine launches an asynchronous thread for executing a search on the compressed tokenized data segments based on the keywords included in the string permutation. The execution of the searches for of all of the string permutations generates a plurality of search results, each search result identifying a row in the database that includes data relevant to the set of keywords.

To rank the search results, the search orchestration engine computes a score associated with each search result that indicates a relevance between the search result and the original search string. The search results are stored in an ordered queue in which the results are ordered based on the score associated with each search result. The search orchestration engine selects a subset of the search results in the ordered queue and retrieves data from rows in the database identified by the selected results for display in response to the request.

In one embodiment, the search orchestration engine includes a query building module, a thread launching module, a result ranking module and a result rendering module. The query building module receives a textual search string from a user and processes the search string to generate multiple string permutations. For each permutation, the query building module determines a string similarity score indicating the similarity between the string permutation and the search string. The thread launching module launches a different thread for executing an asynchronous search for each string permutation. The result ranking module asynchronously receives search results and computes a permutation result relevance score for each search result. A permutation result relevance score indicates relevance between the search result and the string permutation that was executed to generate the search result. For each of the search results, the result ranking module generates a result relevance score that combines the string similarity score associated with the string permutation that was executed to generate the search result and the permutation result relevance score of the search result. A result relevance score for a particular search result indicates how relevant the search result is to the search string provided by the user. The result ranking module ranks the search results according to their relative result relevance scores. In operation, the result ranking module maintains an ordered queue of search results and selects from the ordered queue search results that are to be displayed in response to the search string. The result rendering module transmits data associated with the search results selected by the result ranking module for display to the user.

With the techniques described herein, a keyword search may be performed on a database without requiring a user to specify specific tables or columns in the database where the search should be conducted. In fact, the user may not have any knowledge of the underlying database schema as the technique described herein automatically searches all permutations of the search string against all columns in the database. Specifically, the keyword search performed on a database identifies the rows in the database that contain data relevant to the search string provided by the user. Once the search results are filtered for accuracy, the data in the rows identified by the filtered search results are retrieved and presented to the user. Consequently, read operations are performed only once the relevant search results are identified, thereby reducing expensive database operations during the keyword search process.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

These and other features, aspects, and advantages of the present invention will become better understood with regard to the following description, appended claims, and accompanying drawings where:

FIG. 7 is a block diagram illustrating a compaction method according to one embodiment.

FIG. 8A is block diagram illustrating the use of Boolean operations on bit vectors to generate query results according to one embodiment.

FIG. 11 is a block diagram showing programming instructions in the form of software modules for orchestrating the processes described herein according to one embodiment.

FIG. 14 illustrates three tables corresponding to a domain structure, T1, T2, and T3 according to one embodiment.

FIG. 15 illustrates a result set for a query specifying a parameter "value like %10%" across three domains according to one embodiment.

DETAILED DESCRIPTION

Figure 1:
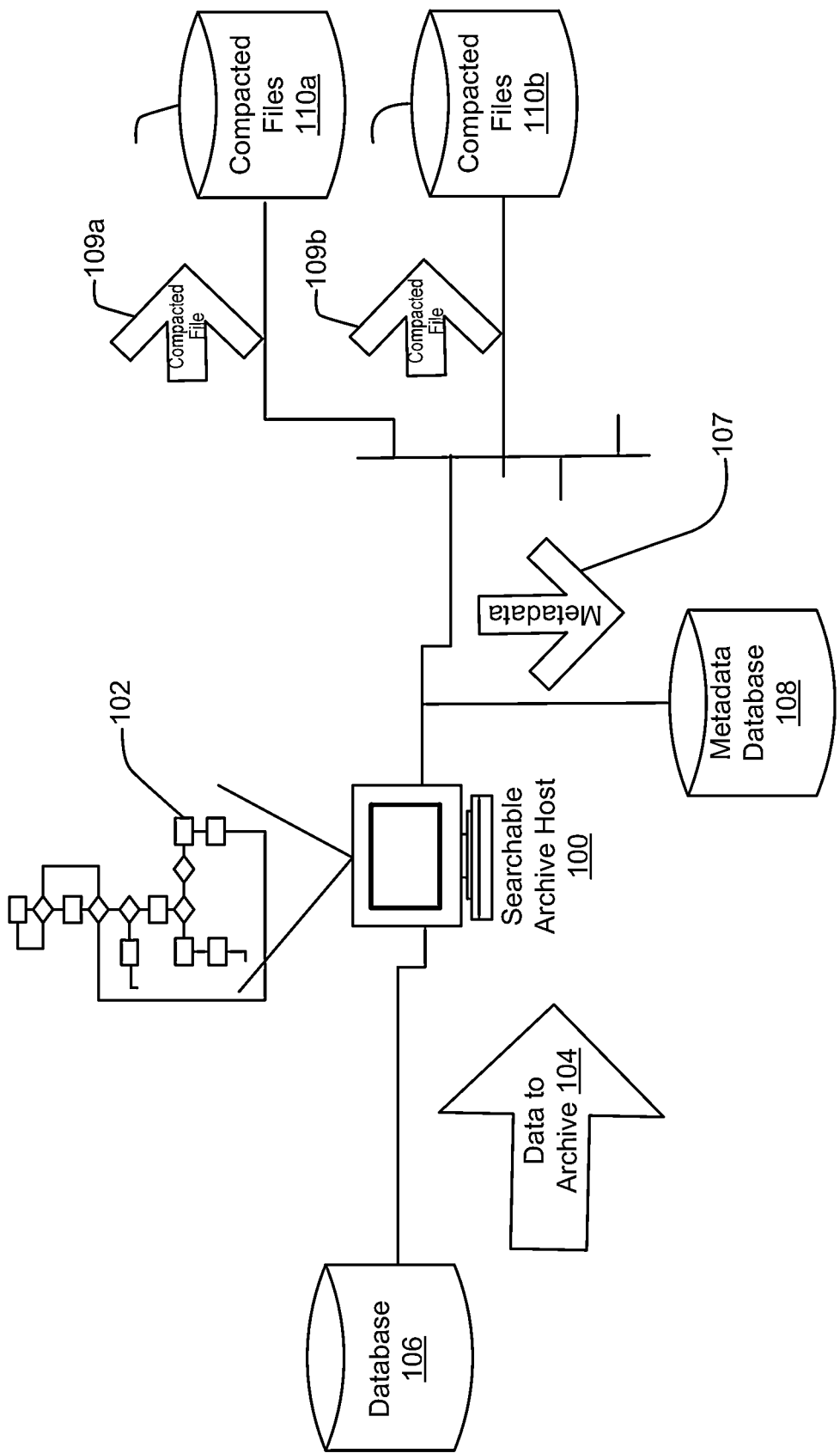
FIG. 1 is a block diagram of a searchable archive system in an archiving mode according to one embodiment.

FIG. 1 is a block diagram of a searchable archive system in an archiving mode in accordance with one embodiment of the present invention. A searchable archive system includes a searchable archive host 100. The searchable archive host hosts an archiving process 102. The archiving process receives or gets archive data 104 from a database 106, such as a tabular file in a format such as a Comma Separated Value (CSV) formatted text file, coupled to the searchable archive host. The archiving process extracts metadata 107 describing the archive data from the archive data and stores the metadata in a metadata database 108. The archiving process also generates one or more compacted files, such as compacted files 109a and 109b, that are stored in one or more compacted file data storage devices, such as compacted file storage devices 110a and 110b.

As illustrated in FIG. 1, the storage devices are coupled directly to the searchable archive host. In other embodiments, the storage devices are loosely coupled to the storage devices through a communications network. This enables the searchable archive to be distributed across as many storage devices as necessary to storage the compacted files. In addition, the loose coupling between the metadata and the compacted files allows the searchable archive to be added to in an incremental manner without requiring reconstituting the original archive data using the compacted files.

Figure 2A:
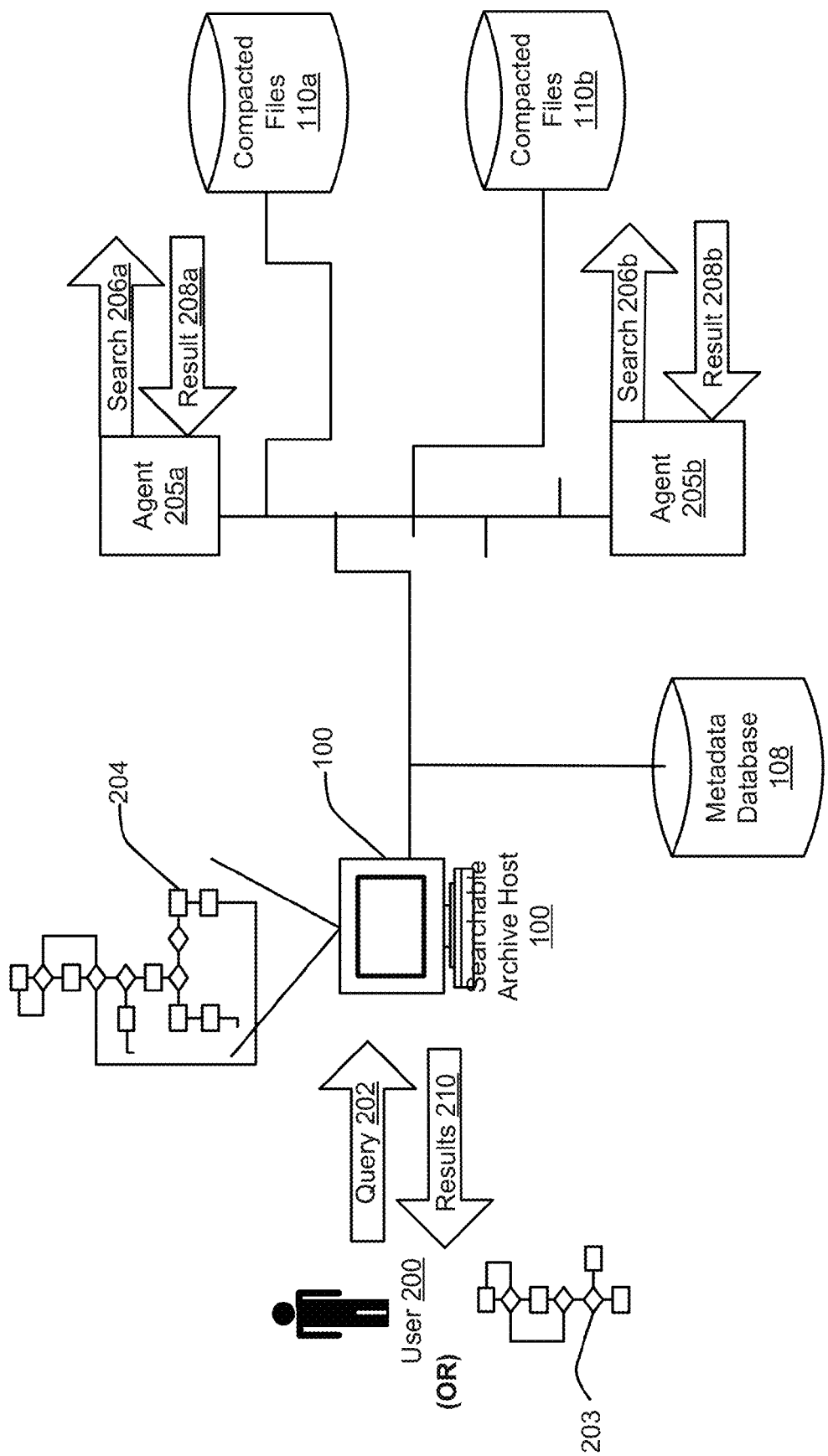
FIG. 2A is a block diagram of a searchable archive system in a data retrieval mode according to one embodiment.

FIG. 2A is a block diagram of a searchable archive system in a data retrieval mode in accordance with one embodiment of the present invention. Once an archive is created, a user 200 or an automated process may access the compacted files without reconstituting the entire original archive data structure. To do so, the user uses a search process 204 hosted by the searchable archive host. The user submits a query 202 to the search process. According to another embodiment, the query 202 is one or more data model queries received from a separate process 203, e.g., via the process 1200 as described in conjunction with FIG. 12. The search process uses a metadata database 108 to identify which compacted files may have archived data that will satisfy the query. The search process then accesses each identified stored compacted file to determine if there are any actually data stored in the compacted file that will satisfy the original query. The search process does so through the use of one or more search agents, such as search agents 205a and 205b, that independently access one or more compacted files stored in the compacted file storage devices, such as storage devices 110a and 110b.

Each search agent conducts an independent search, such as search 206a by search agent 205a and search 206b by search agent 205b, of one or more compacted files identified by the search process. Each search agent also independently reports search results, such as search results 208a and 208b, back to the search process. The search process uses the search results received from the search agents to build a search result 210 that is presented to the user.

Figure 2B:
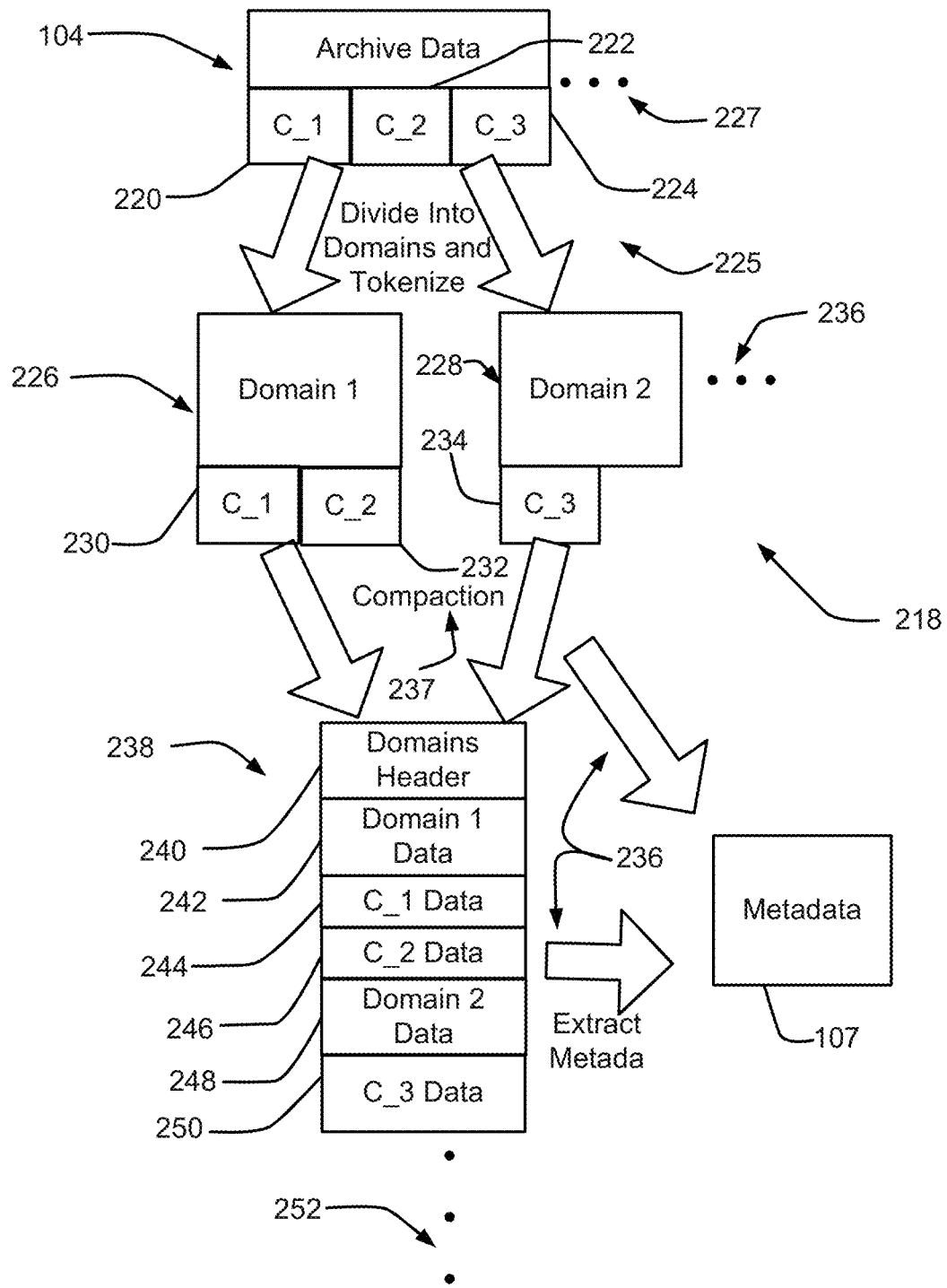
FIG. 2B is a flow diagram of a searchable archive generation process according to one embodiment.

FIG. 2B is a flow diagram of a searchable archive creation process in accordance with one embodiment of the present invention. A searchable archive creation process 218 receives archive data 104 including one or more columns of values, such as columns 220, 222, and 224. The number of columns in the archive data, and the number of values in the columns, is arbitrary as indicated by ellipses 227. The process associates 225 the columns of data in one or more domains, such as domains 226 and 228. Each domain may then be associated with one or more columns of data from the archive data.

After associating the columns to domains, each domain is processed separately to generate columns of tokens corresponding to the value columns in a tokenization process. For example, token column 230 is associated with domain 226 and corresponds to value column 220 in the archive data. In a similar manner, token column 232 is associated with domain 226 and corresponds to value column 222. In this example, two domains are shown. Domain 228 is associated with only a single token column 234 corresponding to value column 224 in the archive data. Ellipses 236 indicate that the number of domains and associated token columns is arbitrary as the number of columns in the archive is arbitrary.

Once the domains and token columns have been created, they are compressed in a compaction process 237 to create a compacted file 238. Within the compacted file, information about the domains included in the compacted file is stored in a domains header 240. In addition, domain data for each domain is stored in the compacted file. For example, domain data 242 corresponds to domain 226 created during the tokenization process and domain data 248 corresponds to domain 228. The domain data includes a domain structure associating unique values from the archive data to token values used to generate the token columns. The compacted file further includes compressed token column data, such as compressed token column data 244, 246, and 250 for each token column associated to a domain. For example: compressed token column data 244 corresponds to token column 230; compressed token column data 246 corresponds to token column 232; and compressed token column data 250 corresponds to token column 234. Ellipses 252 indicated that the size of the compacted file is arbitrary as it is dependent on the size of the original archive data set.

During the tokenization and compaction process, archive metadata and segment metadata 107 is extracted 236 for use as an index for accessing the compacted file. The metadata may exported in a variety of formats that may be useful an archive retrieval process.

Figure 3:
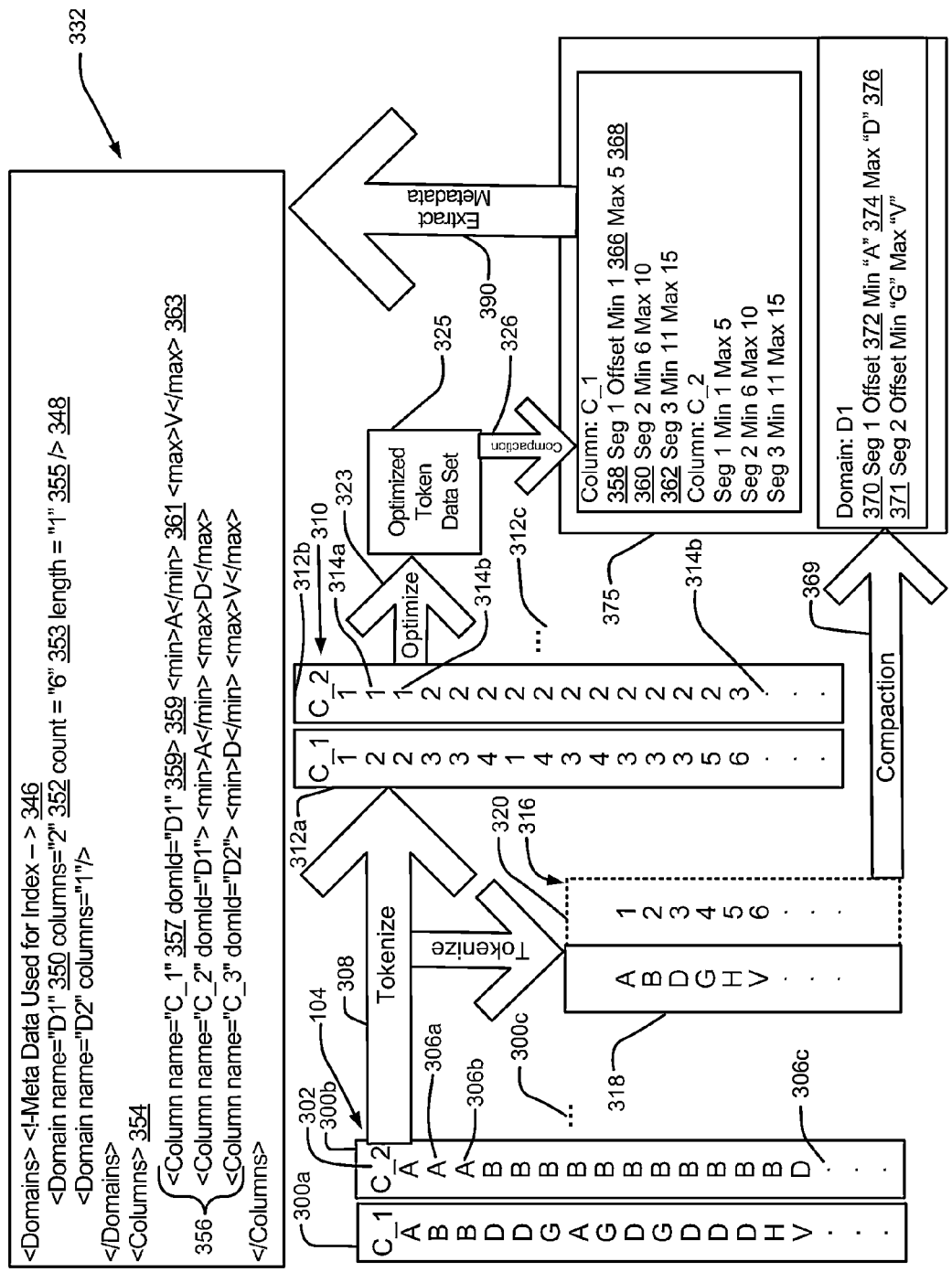
FIG. 3 is a block diagram of a searchable archive creation process according to one embodiment.

FIG. 3 is a block diagram of a compacted file creation process in accordance with one embodiment of the present invention. In a compacted file creation process, a portion of an archive data set 104 associated with a domain includes one or more value columns, such as value columns 300a and 300b, of tabulated values. Ellipses 300c indicate that the number of value columns in the archive data set is arbitrary. Each value column may be characterized by a value column header 302 and one or more rows of tabulated values, such as rows 306a and 306b. Ellipses 306c indicate that the number of rows in the value columns are arbitrary.

During the archive creation process, the archive data set is tokenized 308. During tokenization, the values in a value column are replaced with tokens to create a token column. If the length of the token is less than the length of the unique value, then the overall size of the column of data will be reduced, thus compressing the archive data set. For example, in the block diagram, a tokenized data set 310 is generated from the archive data set 104 during tokenization. The tokenized data set retains the column formation of the archive data set. In the example, token column 312a corresponds to archive value column 300a and token column 312b corresponds to archive value column 300b. Ellipses 312c indicate that the number of token columns correspond to the number of value columns in the original archive data. In each token column, a token exists for each value in the original corresponding archive data value column. For example, token 314a corresponds to value 306a and token 314b corresponds to value 306b. Ellipses 314c indicate that the number of tokens in a token column correspond to the number of values in the archive data's corresponding column.

In addition to a tokenized data set, tokenization creates a domain structure 316 associating the token values and the unique values. The domain structure includes the sorted unique values 318 extracted from the archive data. Their position inside the list is their associated token value. In addition, as the unique values are stored in sorted form, their position in the table also indicates a lexical id for their corresponding token values. This feature of a domain structure is illustrated by lexical id column 320 shown in phantom.

Once the tokenized data set has been created, opportunities exist to optimize 323 the size of the tokenized data set. For example, before the domain structure is complete, it is difficult to determine the optimal size of the tokens because the number of tokens needed to represent the unique values in the archive data is unknown. However, after the domain structure 316 is complete, the total number of tokens, and therefore the optimal size for the tokens, can be easily calculated. Once the optimal token size is determined, the tokens in the tokenized data set may be replaced with a new set of optimally sized tokens thus creating an optimized token data set 325.

The optimized domain structure is compacted 369 by dividing the domain structure into one or more compressed domain structure segments, such as compressed domain structure segments 370 and 371, in compacted file 375. The number and size of the domain structure segments depends on the number of unique values in the domain structure. During compaction, the domain structure is examined to determine how to divide the domain structure into individual compressed domain structure segments. The determination is based on the desired size of the compressed domain structure segments and the number of unique values in the domain structure. For example, if a domain structure has very few unique token values, it may compress to a small size and may fit within one compressed domain structure segment. In contrast, if a domain structure contains many unique values, more than one compressed domain structure segment is used to hold the compacted domain structure.

For each domain structure segment, the minimum and maximum values are kept for the domain structure segment. As no value exists in more than one domain structure segment, the minimum and maximum values constitute a coarse index that is used to determine which domain structure segments should be used when searching for a particular unique value. The segments are then individually compressed using a prediction by partial matching (PPM) algorithm. This type of algorithm uses the last few characters of a value to predict the next character and is well suited for compression of the domain structure because the unique values are already sorted.

In the illustrated compacted file 375, the compacted file includes domain D1 having a domain structure divided into two compressed domain structure segments 370 and 371. An offset 372 indicates the position in the compacted file of a compressed domain structure segment. In addition, a minimum value 374 and a maximum value 376 indicate the range of unique values included in the compressed domain structure segment.

After tokenization and optimization, the optimized tokenized data set is compacted 326 and stored in the compacted file 375 as well. For each token column in the tokenized data set one or more compressed token column segments are created. The number and size of the compressed token column segments depends of the numbers of tuples (records) of the archive data set. For each compressed token column segment, starting and ending tupleid are recorded. As there is a low degree of correlation between the tokens stored in the token columns, a statistic algorithm based on arithmetic coding is used for the creation of the compressed token column segments.

As an example, in the illustrated compacted file 375, the compacted file includes compressed token column segments 358, 360, and 362 corresponding to token column 312a which corresponds to value column 300a. For each compressed token column segment, a minimum tupleid 366 and a maximum tupleid 368 are indicated. Compressed token column segments are located in the compacted file for each token column associated with the domain.

Once completed, the compacted file 375 includes compressed domain structure and token column data. During the tokenization and compaction process, domain metadata, token column metadata, and segment metadata is extracted 390 from the domain structure and the token columns. Portions of the extracted metadata is included in the compacted file as a header accessible without decompressing any of the segments in the compacted file. Portions of the archive metadata are also included in a metadata file 332. The metadata file may be used by a data processing system to access data stored in the compacted files.

An exemplary metadata file 332 is illustrated in an eXtensible Markup Language (XML) format; however, any format may suffice. In the metadata file, metadata is included to show metadata extracted from a first and second domain; however, the number of domains is arbitrary. Within an XML format metadata file, a "Domains" tag 346 includes one or more domain tags 348. Each domain tag includes a "Domain name" attribute 350 and a "columns" attribute 352. The columns attribute indicates the number of token columns in a domain. A "count" attribute 353 indicates the number of total unique values stored in the domain structure. A "length" attribute 355 indicates the length of the unique value storage locations within the domain structure.

A "Columns" tag 354 includes one or more column tags 356. Each column tag includes a "Column name" attribute 357 indicating the name of a value column from the archive data included in the compacted file. The column tag further includes a "domId" attribute 359 indicating the domain to which the column belongs. A "min" attribute 361 indicates the minimum unique value found in the column. A "max" attribute 363 indicates the maximum unique value found in the column.

Referring again to FIG. 1 once the compaction process is completed, a compacted file 375 (of FIG. 3) is stored in a file system having one or more compacted file data stores, such as compacted file data store 110*a* and 110*b*. Metadata file 332 (of FIG. 3) is used to populate a metadata database 108. As the compacted files are stored in a file system, new archive data may be added to the archive system to the capacity of the file system. In addition, metadata may be added to the metadata database to the extent of the capacity of the metadata database.

Figure 4:
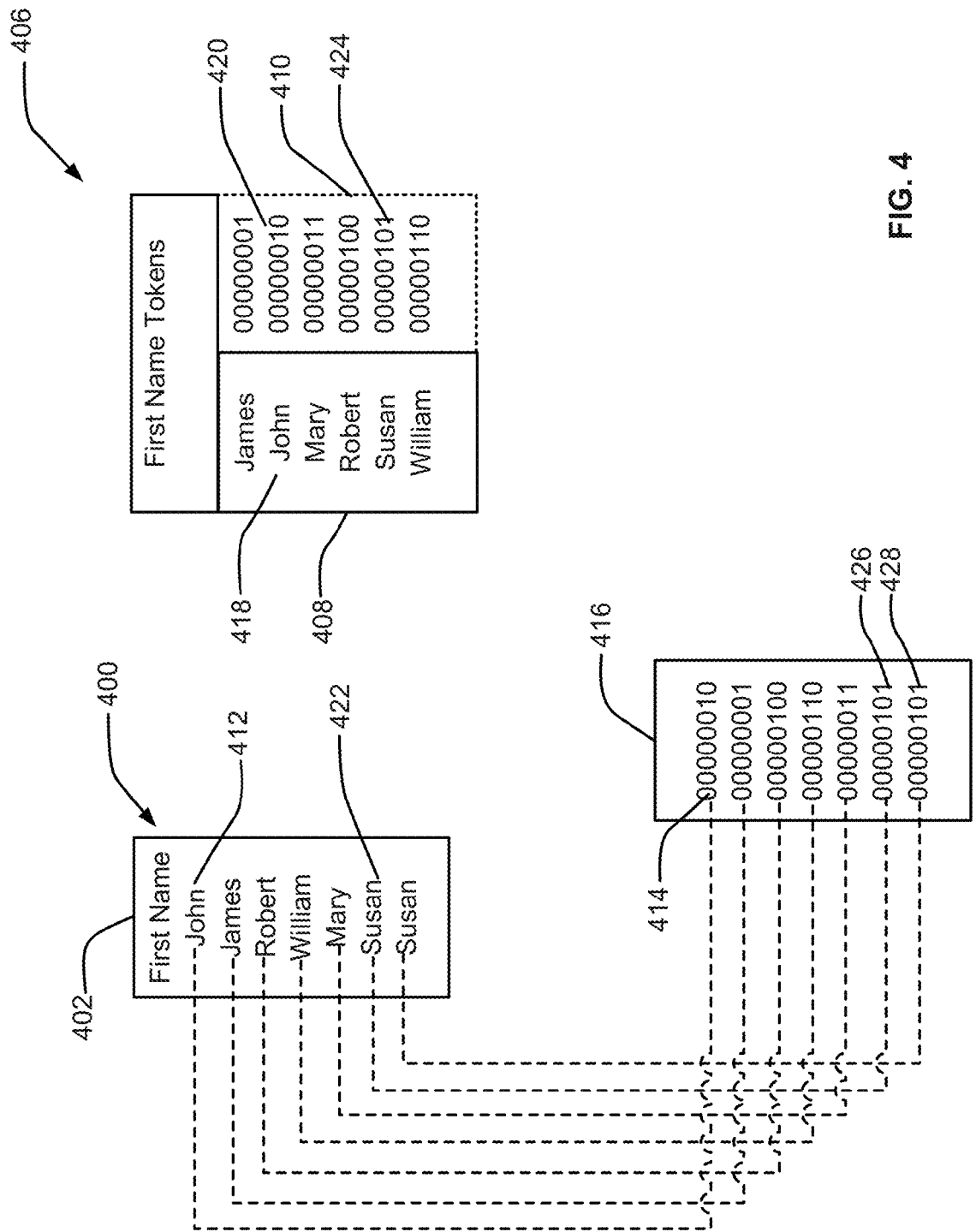
FIG. 4 is a block diagram of a tokenization process according to one embodiment.

FIG. 4 is a block diagram of a tokenization process in accordance with one embodiment of the present invention. In the illustrated tokenization process, an archive data set 400 includes a "First Name" column 402. In this illustration, each unique First Name column entry is replaced by an eight bit token. For the First Name column, a "First Name Tokens" domain structure 406 is created. The domain structure has a name column 408 for storage of unique first names encountered in the archive data set. The domain structure includes a token column 410 for storage of tokens assigned to the unique values.

In this example, the name "John" 412 is the first unique value in the column and is replaced by the token "00000010" 414 in the tokenized data set 416. An entry is made into the domain structure for the unique value "John" 418 and the assigned token value "00000010" 420. For each subsequent unique value in the column, a new token value is generated, associated with the unique value in the domain structure, and used to replace the unique value in the tokenized data set.

In the case where the unique value is encountered in the archive data again, a new token value is not generated. Instead, the token value is read from the domain structure and inserted into the tokenized data set. In the illustrated example, the unique value "Susan" 422 appears in the archive data more than once. The value Susan is associated in the domain structure with the token "00000101" 424. This token is then inserted into the tokenized data set two times, at location 426 and 428, to represent the two instances of Susan in the original archive data.

Figure 5:
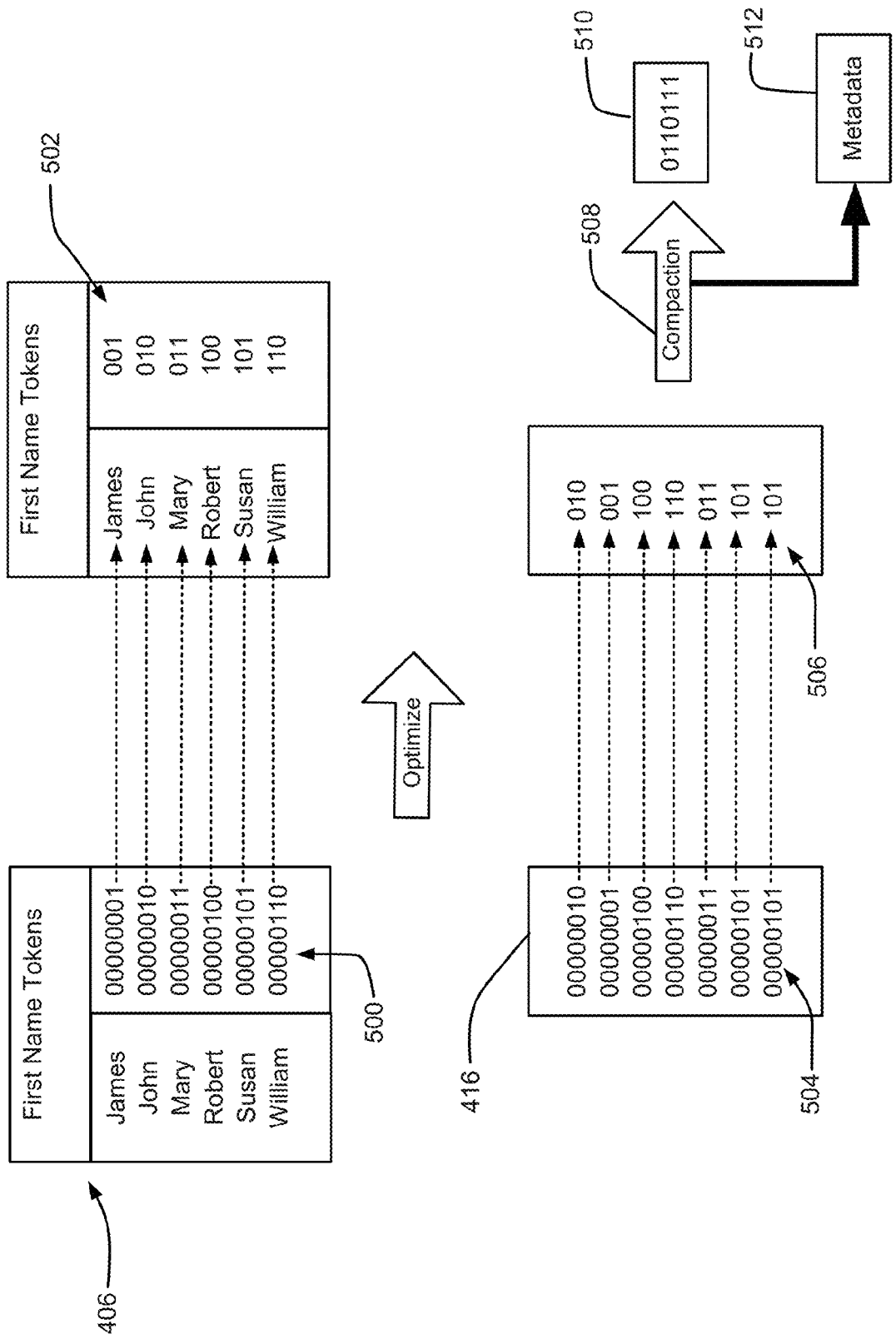
FIG. 5 is a block diagram of a token optimization process and tokenized data set compaction process according to one embodiment.

FIG. 5 is a block diagram of a token optimization process and tokenized data set compaction process in accordance with one embodiment of the present invention. Once a tokenized data set is created from the archive data, the number of tokens needed to represent all of the unique values in the archive data is known. Therefore, an optimal size can be determined for the size of the tokens used. In the example of FIG. 4, an eight bit token is used. An eight bit token can represent up to 256 unique values. However, at the end of the tokenization process, it can be seen that the number of unique values in the example was only six. Therefore, a three bit token is all that is required to give each unique value a unique token value. Referring again to FIG. 5, domain structure 406 is optimized by replacing eight bit tokens 500 in the token column with three bit tokens. This generates an optimized domain structure having three bit tokens 502. In a similar manner, tokenized data set 416 from the example in FIG. 4 is optimized by replacing eight bit tokens 504 with three bit tokens 506.

Once the tokenized data set has been optimized, it may be compacted 508 to generate a compacted file 510. During the compaction process, previously described metadata 512 is extracted from the tokenized data set.

Figure 6:
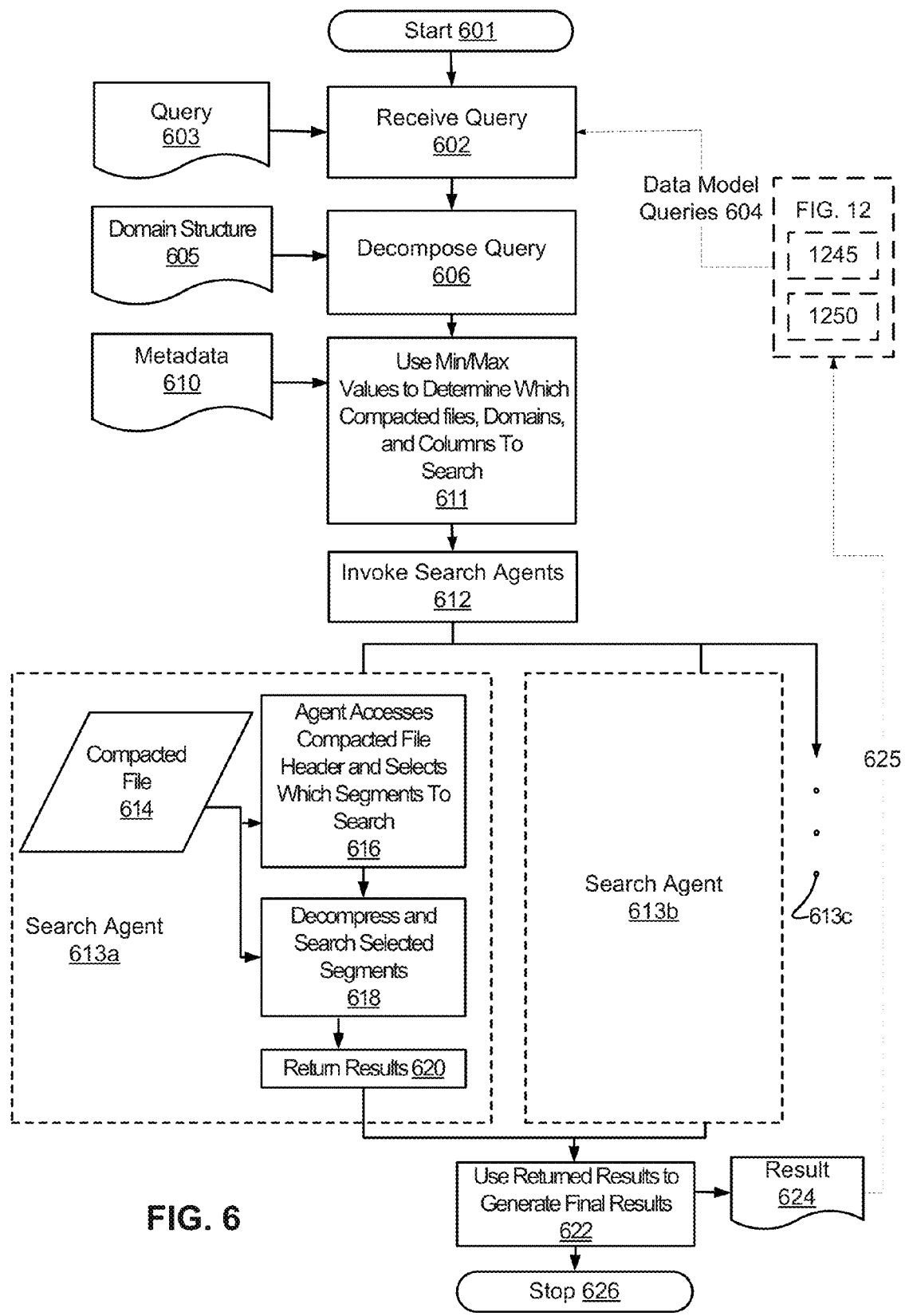
FIG. 6 is a process flow diagram of a search process employing search agents according to one embodiment.

FIG. 6 is a process flow diagram of a search process employing search agents in accordance with one embodiment of the present invention. As previously described, search agents, such as search agents 205*a* and 205*b* (of FIG. 2), are used within the archive system to access the compacted files and retrieve archive data. The search agents are invoked by a search process 204 (of FIG. 2). At the start 601 of a search process, the search process receives 602 a query 603 from a user or an automated process. The search process uses a domain structure 605 to decompose 606 the query into an equivalent tokenized query. According to one embodiment, the query received 602 is from a set of data model queries 604 produced by the process described in conjunction with FIG. 12, transmitted to the search process in step 1245.

The search process accesses metadata 107 to determine 611 which compacted files, domains, and columns need to be searched to find archived data that may satisfy the query, and to remove from consideration archived data that is unnecessary to search. The search process does so by using the minimum and maximum token values extracted from the columns in a compacted file before the columns were segmented and compressed. These minimum and maximum values are compared to the token values in the tokenized query to make the determination as data associated with token values that are outside the minimum and maximum values of a compacted file will not be found in the compacted file. Once the determination is complete and compacted files have been selected, the search process invokes 612 one or more search agents, such as search agents 613*a* and 613*b*, that will independently access the identified compacted files. Ellipses 613*c* indicate that an arbitrary number of independently functioning search agents may be invoked by the search process. This allows the search process to search a plurality of compacted files independently and in parallel. In addition, as search agents are used to access the compacted files, the compacted files may be maintained in any convenient manner and loosely coupled to the search process.

The following search agent process is described for a single search agent; however, each invoked search agent will perform similar search processes in parallel. Once invoked, each search agent accesses 616 a compacted file 614 and searches the compacted for archived data that may satisfy the query. To do so, the search agent reads the compacted file's header to determine which domain structure segments may contain data that may satisfy the query. As the compacted file's header includes the minimum and maximum token values stored in each compressed domain structure segment, the search agent may determine which segments may include data that will satisfy the query. Once a compressed segment has been identified as possibly containing the desired data, the search agent decompresses 618 the selected compressed segment and searches the decompressed segment for the requested data and identifies the token associated with the values involved into the request criteria. The process is repeated for each compressed segment identified by the search agent as potentially containing the desired archive data. After that process, token representation of the request criteria is used to analyze each tokenized dataset segment involved. The search agent returns 620 any result data found during the search to the search process. The search process collects all of the returned results to generate a final search result 624 and stops 626 searching. According to one embodiment, the result 624 is transmitted 625 back to the process described in conjunction with FIG. 12, where it is received at step 1250.

FIG. 7 is a block diagram illustrating a bit vector based compaction method in accordance with one embodiment of the present invention. In this compaction method, the compacted file may be searched in its entirety without decompressing any of the data stored in the compacted file. Archive data 700 having multiple columns of data is tokenized and optimized as previously described. In this example, the archive data is a listing of first and last names of a group of individuals with the first names in a first archive value column 702 and the last names in a last name archive value column 704. The result of the tokenization and optimization process is a tokenized and optimized data set 706. The tokenized data set includes a first name token column 708 corresponding to the first name archive value column and a last name token column 710 corresponding to the last name archive value column. The tokenized data set may be compressed through the generation of a set of bit vectors 712.

Each bit vector in the set of bit vectors corresponds to a token. The length of each bit vector is equal to the number of token values in a token column. The values in the bit vector reflect the presence or absence of the corresponding token at a particular position in the token column. For example, bit vector 718 corresponds to the token "011" in the first name token column. Token "011" appears at the fifth position in the first name token column; therefore, a "1" appears in the fifth position in bit vector 718. As token "011" corresponds to the name "Mary" in the first name column of the archive data, this means that the name "Mary" is the fifth entry in the first name value column of the archive data set. In a similar manner, bit vector 724 corresponds to the last name "Adams" in the last name value column of the archive data set. Upon completion of the vectorization process, the compacted file consists of subsets of bit vectors with each subset corresponding to a token column in the tokenized data set and thus a column in the archive data set. In this example, bit vector subset 714 corresponds to the first name value column 702 in the archive data and bit vector subset 716 corresponds to the last name value column 704 in the archive data.

One feature of the tokenization process is that it creates a lexical ordering of the values in a column of an archive data set. As such, the bit vectors need not be stored with header information identifying which bit vector is associated with which token. Instead, the bit vectors are stored in a compact fashion in the lexical order of the tokens.

FIG. 8A is block diagram illustrating the use of Boolean operations on bit vectors to generate query results in accordance with one embodiment of the present invention. The bit vectors of FIG. 7 may be used directly in Boolean operations to satisfy queries. As an example, a query for the name "Mary Adams" may be decomposed into a query expression 800 of "First Name=Mary" AND "Last Name=Adams". This expression may be evaluated for the entire compacted file 712 (of FIG. 7) by selecting bit vector 716 corresponding to the first name "Mary" and bit vector 724 corresponding to the last name "Adams". These bit vectors may be combined in a Boolean AND operation 802 to yield a result bit vector 804. This bit vector has a "1" 806 in the fifth position indicating that the name "Mary Adams" is found in the compacted file.

Figure 8B:
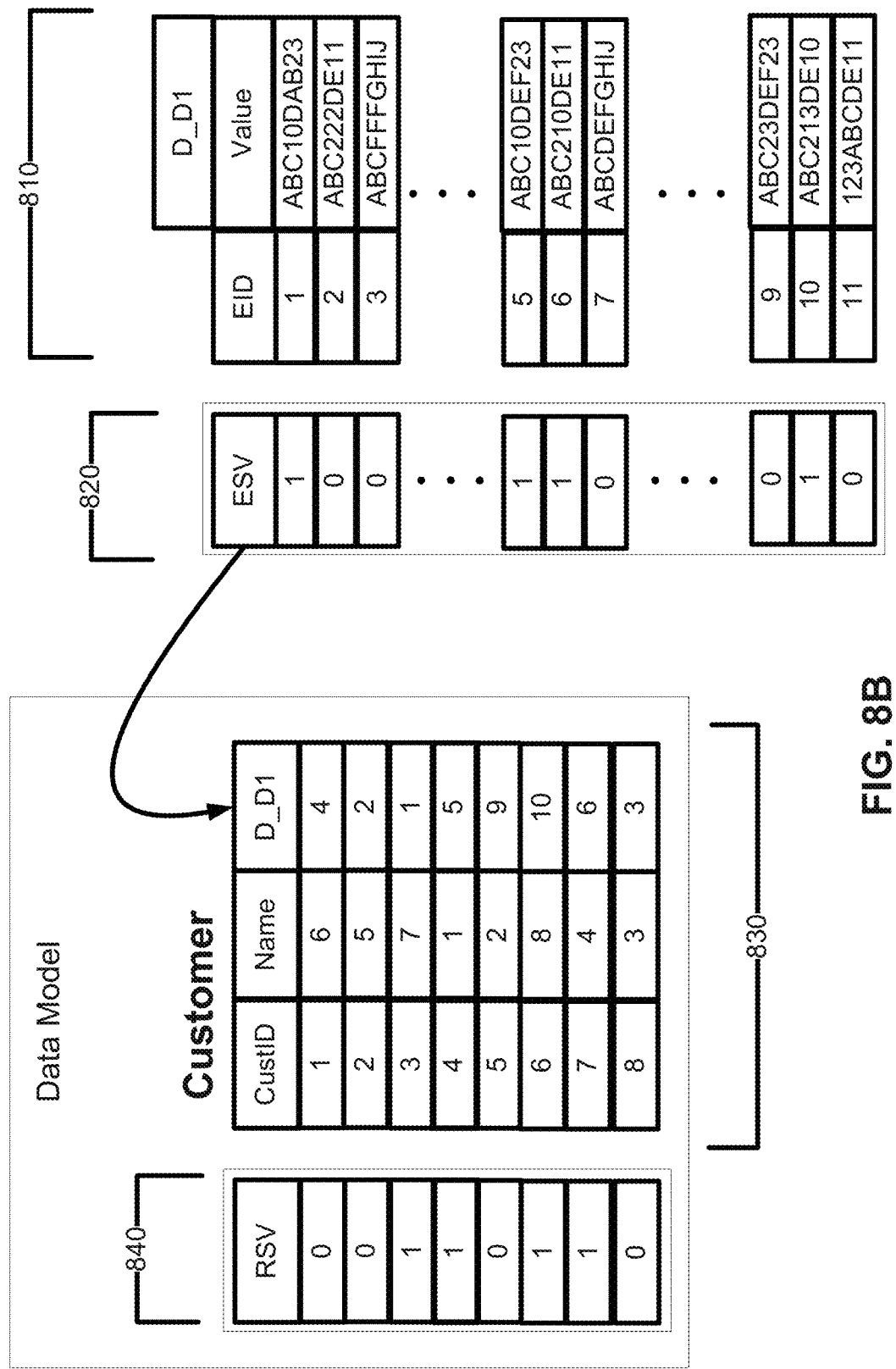
FIG. 8B is a block diagram showing an illustration of a bit vector based compaction method used in conjunction with selection criteria for a query according to one embodiment.

FIG. 8B is a block diagram showing a different illustration of a bit vector based compaction method according to one embodiment, as used in conjunction with selection criteria for a query. As in FIG. 7, this method allows the compacted file to be searched in its entirety without decompressing any of the data stored in the compacted file. Domain 810 shows Domain 1 (D1 as later described in conjunction with FIGS. 15 and 16). An abbreviated list of domain values are shown, with their corresponding entity IDs (EIDs).

Selection criteria corresponding to a query are applied to the domain to provide an entity selection vector (ESV) 820. In this example the SQL query is:

```
SELECT *
FROM DATA_DISCOVERY.FAS_DD
WHERE VALUE LIKE '%10%'
```

Thus, a criterion is that the value include "10" (wild cards on each side). The ESV 820 is a bit vector, with each bit value representing the presence or absence of a value in each row corresponding to the selection criteria. For example, since the rows corresponding to EIDs 1, 5, 6, and 10 of domain 810 are the rows that include a value corresponding to "like %10%," those rows have a 1 in the ESV, whereas the other rows have a 0.

Next, the ESV 820 is promulgated to the underlying customer table 830 to create the row selection vector (RSV) 840, which will be used to select rows to return as results based on the query parameters. Again, EIDs 1, 5, 6, and 10 correspond to ESV 820 values of 1, thus the corresponding rows in RSV 840 for these EIDs in the D_D1 column are shown as 1, i.e., the third, fourth, sixth, and seventh entries in RSV 840. The remaining rows are shown as 0, and thus will not be selected. As discussed below in FIG. 16, a result set for a query specifying a parameter "value like %10%" across three domains is shown, with the top four rows corresponding to the rows selected via RSV 840 in FIG. 8B.

Figure 9:
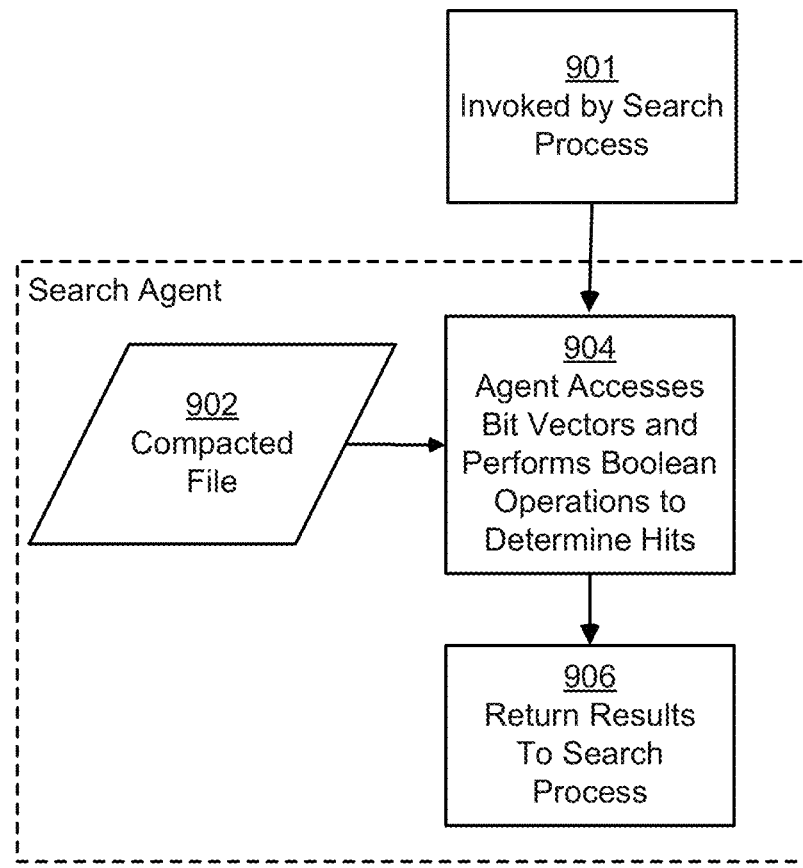
FIG. 9 is a process flow diagram of a search agent process for an archive system using compacted files having bit vectors according to one embodiment.

FIG. 9 is a process flow diagram of a search agent process for an archive system using compacted files having bit vectors in accordance with one embodiment of the present invention. The operation of a search process 204 (of FIG. 2) is similar whether or not a compacted file uses bit vectors or compressed segments. However, the operations of a search agent, such as search agent 205*a* (of FIG. 2), are different depending on whether or not the compacted file accessed by the search agent includes bit vectors or compressed segments. A search agent 900 used with compacted files having bit vectors is invoked 901 by a search process. The search agent accesses a compacted file 902 selected by the search process. The search agent then selects 904 one or more bit vectors corresponding to a datum that the search agent is searching for. The search agent then performs a Boolean operation on the selected bit vectors to determine if the data in the compacted file satisfies a query received from the search process 204 (of FIG. 2). At the completion of the Boolean operation, a bit vector is created to act as a selector which is used to identify which tuples should be returned. Based on the projection list, list of columns or attributes to be returned in the request, and the bit vector record selector, the search agent materializes the result data. The materialization of the result data is executed doing an inversion process where the token ID of the desired tuples are replaced with the value using a lookup function is used to implement it. At the completion of that materialization process, the search agent returns 906 any results to the invoking search process. Bit vector processing in general is discussed in greater detail in U.S. Pat. No. 5,036,457 issued to Glaser et al. the contents of which are hereby incorporated by reference as if stated in full herein.

Figure 10:
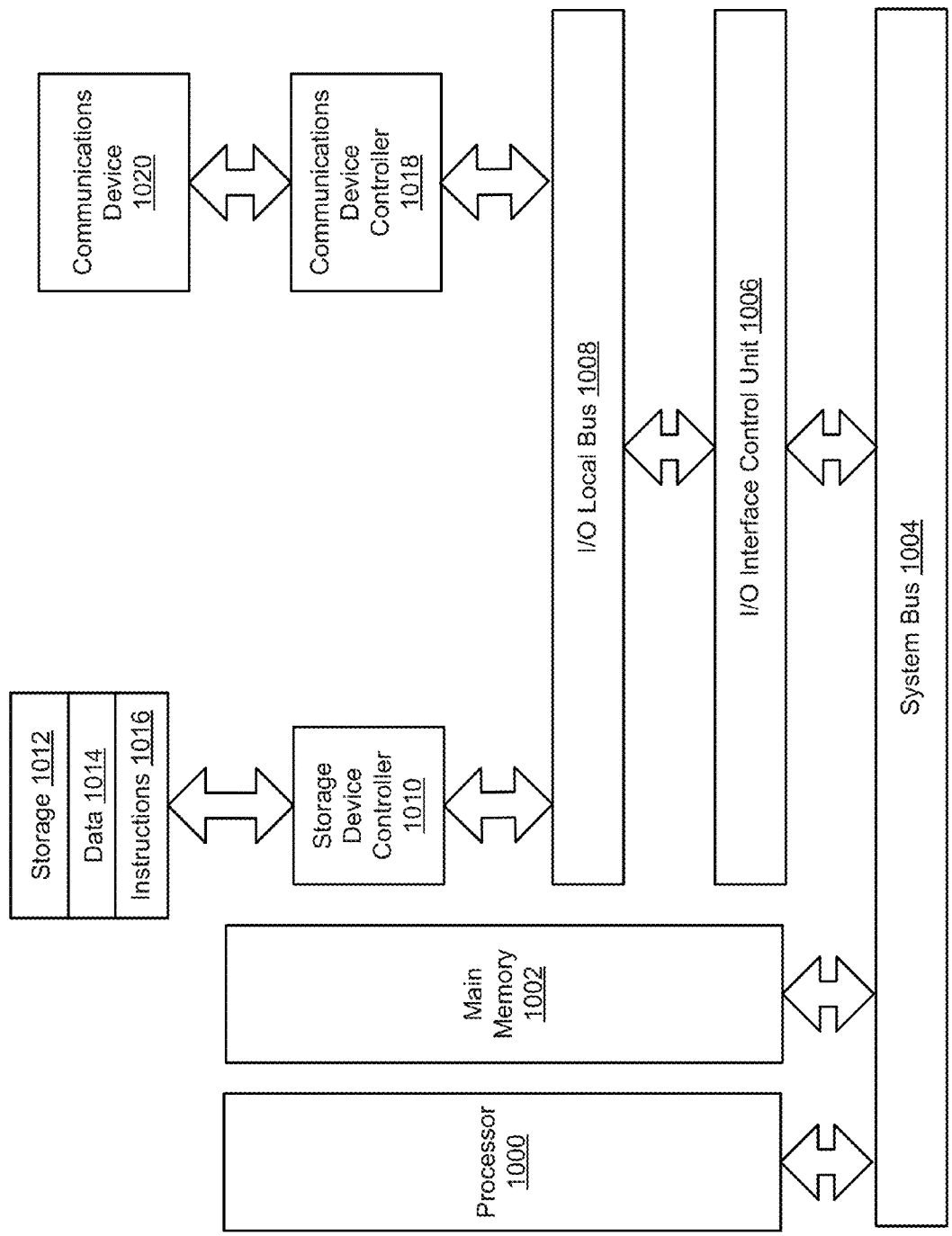
FIG. 10 is an architecture diagram of a data processing system according to one embodiment.

FIG. 10 is an architecture diagram of a data processing apparatus used as an archive system host in accordance with one embodiment of the present invention. The data processing apparatus includes a processor 1000 operably coupled to a main memory 1002 by a system bus 1004. The processor is further coupled to a storage device 1012 through an Input/Output (I/O) control unit 1006, an I/O local bus 1008, and a storage device controller 1010. The storage device may be used to store programming instructions 1016.

In operation, the processor loads the programming instructions (which may take the form of software modules as described in conjunction with FIG. 11 below) from the storage device into the main memory. The programming instructions are then executable by the processor to implement the features of an archiving system as described herein. The storage device may also be used to store data 1014 used by the processor to implement the features of the archive system.

The processor may be further coupled to a communications device 1018 via the Input/Output (I/O) control unit, the I/O local bus 1008, and a communications device controller 1018. The processor may then communicate with other data processing systems or file system for retrieval of compacted files.

FIG. 11 is a block diagram showing software modules for orchestrating the processes described herein according to one embodiment. The modules in this embodiment include archiving modules 1120, search modules 1130, and mapping modules 1140.

The archiving modules 1120 provide functionality for the archiving process 102 as discussed in conjunction with FIGS. 1 and 2B. The archiving modules 1120 include a data retrieval module 1150, a domain and metadata module 1155, and a compaction module 1160.

The data retrieval module 1150 retrieves archive data as described herein, e.g., from database 106, and is one means for performing this function. The domain and metadata module 1155 extracts metadata from the archive data as described herein and stores the metadata, e.g., in metadata database 108, and is one means for performing this function. The domain and metadata module 1155 also associates columns of data into one or more domains, and processes each separately to generate columns of tokens corresponding to the value columns in a tokenization process, e.g., as described in conjunction with FIGS. 7, 8A, and 8B.

The compaction module 1160 generates compacted files as described herein, which are stored in one or more compacted file data storage devices, e.g., devices 110*a* and 110*b*, and is one means for performing this function. The domains and token columns created by the domain and metadata module 1155 are compressed to create the compacted file(s).

The search modules 1130 provide functionality for the search process 204 as discussed in conjunction with FIG. 2A. The search modules 1130 include an ID files module 1165, a search agent module 1170, and a result module 1175.

The ID files module 1165 uses a metadata database to identify which compacted files may have archived data that will satisfy a received query as described herein, e.g., a query received at step 602 of FIG. 6, and is one means for performing this function.

The search agent module 1170 accesses each identified stored compacted file to determine if there are any actually data stored in the compacted file that will satisfy the original query as described herein, and is one means for performing this function. The search agent module 1170 uses one or more search agents, which independently access one or more compacted files stored in the compacted file storage devices, and independently reports search results back to the search process.

The result module 1175 builds a search result based on the search results received from the search agents as described herein, and is one means for performing this function. The result module 1175 then presents the results back to the querying user or process.

Figure 12:
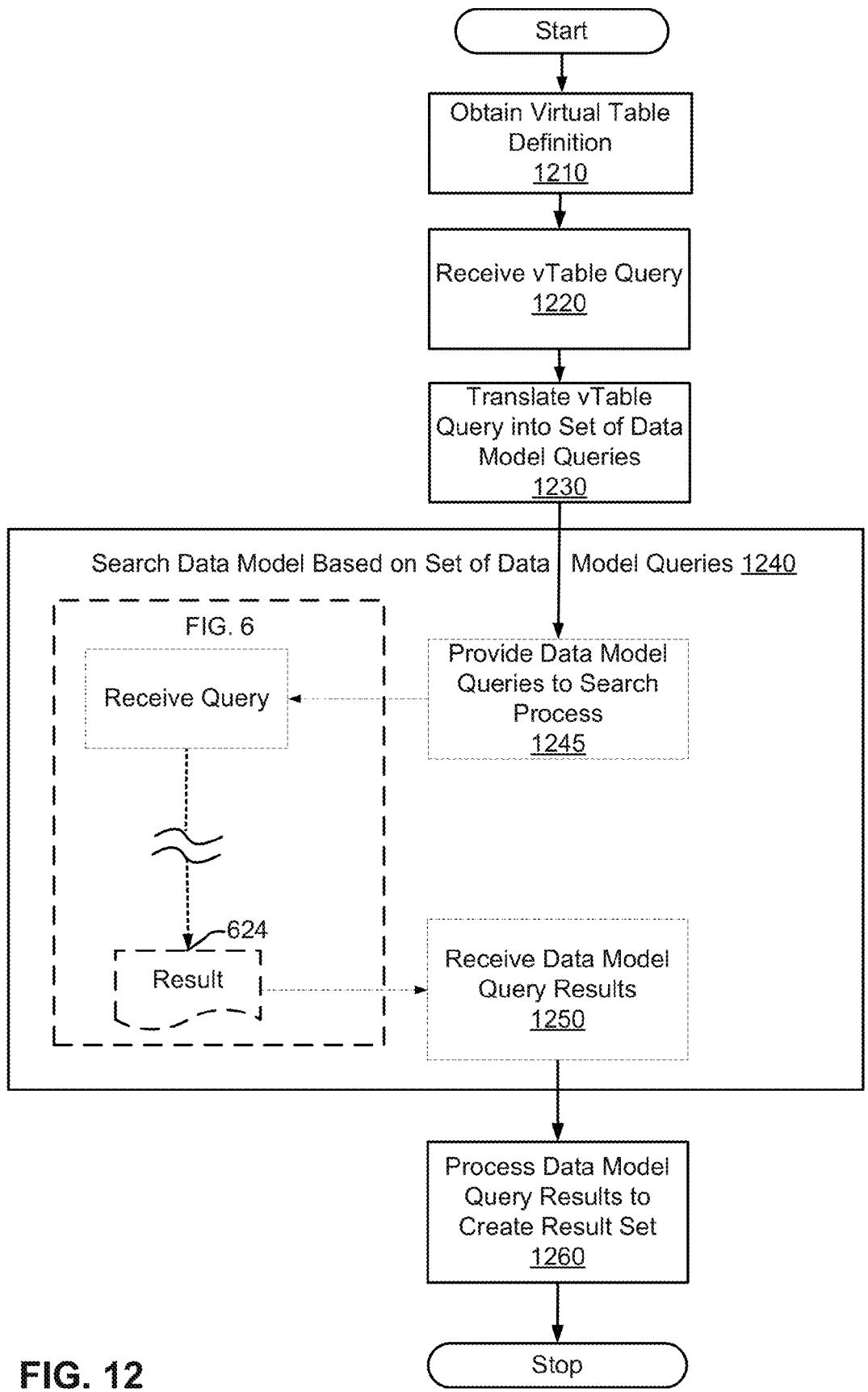
FIG. 12 is a flowchart describing a method of searching a data model using a virtual table according to one embodiment.

The mapping modules 1140 provide functionality for the virtual table-based searching process 1200 as discussed in conjunction with FIG. 12. The mapping modules 1140 include a virtual table module 1180, a query translation module 1185, and a result processing module 1190.

The virtual table module 1180 defines a virtual table that maps to data but is not physically present in the data model as described herein, and is one means for performing this function. Explicit creation of the virtual table is not required. In the described embodiments, a module called <Data_Discovery_Module> is called with the search query as a parameter, e.g., using SQL as described in conjunction with step 1210 of FIG. 12.

The query translation module 1185 receives a query indicating the virtual table, and translates the query into a set of data model queries as described herein, and is one means for performing this function. The query translation module 1185 also may pass the set of data model queries to the search process 204 of FIG. 6, according to one embodiment.

The result processing module 1190 receives results of the set of data model queries, e.g., from the search process 204 of FIG. 6, and processes the results based on the selected one or more columns of the virtual table and any ordering rules to produce a result set as described herein, and is one means for performing this function.

One skilled in the art will recognize that the system architecture illustrated herein is merely exemplary, and that the invention may be practiced and implemented using many other architectures and environments. In addition, the processes performed by the system architecture require an implementation on a computer, and cannot be performed in the human mind by mental steps alone.

FIG. 12 is a flowchart describing a method of searching a data model using a virtual table according to one embodiment. The method allows a keyword search to be performed on the tables and columns of an underlying data model, e.g., the archive data set 104 as described herein.

The method begins by obtaining 1210 a definition of a virtual table. In one embodiment, the virtual table module 1180 performs this step. As known in the art, a virtual table is "virtual" in the sense that it is not physically present in the data model. Rather, it is an interface to existing storage that appears to be, and functions as if it is, a table, but it does not store any data. The virtual table thus can be thought of as a "view" into the underlying data model.

The virtual table concept is use to create an abstraction layer on the data model to enable search requests to be executed without knowledge of the data model. A simple table eliminates the need for the user to understand the underlying data model. The virtual table acts as a template for a search request built over the data model, which allows for construction of the data model queries and enables definition of the lookup scope, if required, so the user query can be received as a single conventional full text query, but then mapped to the underlying queries. This process enables the creation of selection criteria using a universal object, which can be analyzed and transformed into specific underlying queries. The virtual table enables a user to exclude/include portion of the data model via selection of virtual table columns. The use of the virtual table format also provides a uniform result set over distinct data models and formats.

In the examples described herein, the virtual table has the following virtual columns, based upon the information that will be included in the columns of the result data set following step 1260 below:
 SCHEMA (a schema name where the result is found);
 TABLE (a table name where the result is found);
 COLUMN (a column name where the result is found);
 UROWID (the UROWID of the row containing the result); and
 VALUE (the content of the column where the result is found).

The virtual table definition specifies a name, typically in the form SCHEMA_NAME.TABLE_NAME. The virtual table used in the examples herein is DATA_DISCOVERY.FAS_DD. A query to the name of the virtual table initiates the search process described below. This example shows a single FAS (File Archive Service) instance. However, the same FAS instance could support any number of databases and this process allows searching across the databases using this technique. To simplify the data type mapping explanation, the following exemplary virtual table creation is described. However, explicit creation of the virtual table is not required. A module called <Data_Discovery_Module> is called with the search query as a parameter, e.g., using the SQL form presented below.

```
CREATE VIRTUAL TABLE Data_Discovery.Fas_dd (
    SchemaName   VarChar(128),
    Tablename    VarChar(128),
    ColumnName   VarChar(128),
    uRowid       Dec(20),
    Value        VarChar(1024));
INSERT Into Data_Discovery.Fas_dd (
    SELECT * FROM <Data_Discovery_Module>
        WHERE SearchParm = <SELECT .... FROM
              Data_Discovery.Fas_dd WHERE ....>
```

In the next step, a query is received 1220 by query translation module 1185, indicating the virtual table. According to one embodiment, the query is in the form of a Structured Query Language (SQL) query, and specifies a SELECT clause, FROM clause, and a WHERE clause. The SELECT clause may specify one or more of the virtual columns above: SCHEMA, TABLE, COLUMN, UROWID, and/or VALUE, or "*" to select all columns. The FROM clause is used to designate the virtual table by its predefined name. The virtual table is not physically present in the database, but its name triggers the virtual table mode.

The WHERE clause specifies one or more parameters for the query, and in one embodiment specifies keywords for the search of the underlying data model. The WHERE clause may contain any expressions involving any of the above-mentioned columns except for UROWID and sub-queries. Also, the GROUP BY clause is disabled as the UROWID of the underlying table is projected. The VALUE column has no data type explicitly associated with it but is mapped to a VarChar data type to be described and exported to standard SQL front end tools.

In order to narrow the lookup scope, the WHERE clause may specify constraints against the SCHEMA, TABLE and COLUMN virtual table columns. While processing the request, only those columns from archive tables which type satisfy the semantic correctness of the WHERE clause condition will be considered as the lookup candidates. Optionally, an ORDER BY clause may refer to SCHEMA and/or TABLE and/or COLUMN, and specify the ordering of the result set by column.

In addition, the type of columns optionally may be specified that are to be involved in the lookup by using the function CheckType(<column>, <TYPE SPEC>). This function returns 1 if <column> has type of <TYPE SPEC> and 0 otherwise. <TYPE SPEC> specifies the type as one of the following: INTEGER; SMALLINT; DECIMAL[(prec[, scale])]—if prec or scale not specified, the type is not verified against the missing part; DOUBLE; REAL; CHARACTER[(wid)]—if wid not specified, the type is not verified against the missing part; VARCHAR[(wid)]—if wid not specified, the type is not verified against the missing part; DATE; TIME; or TIMESTAMP. Alternatively, the type verification function can be specified as: TYPE (<column>)=/< > <TYPE_SPEC> or TYPE (<column>) in/not in (<TYPE_SPEC> [,<TYPE_SPEC>, <TYPE_SPEC>, . . . ]).

By way of example, suppose the desired query will discover the values for which the rightmost four characters of each database entry, when collectively converted into an integer, have an integer value that is greater than 10. In addition, the query will limit to tables having table names containing the string "CL" and having the columns with column names ending in "ID" (e.g., "CUSTOMER_ID"), and which tables store data values that are of CHAR/VARCHAR/INTEGER/SMALLINT types only. Finally, the result should be sorted by table name in ascending order and by column name in descending order.

The corresponding SQL query would be:

```
1  SELECT "table", "column", "urowid", "value"
2  FROM DATA_DISCOVERY.FAS_DD
3  WHERE "table" LIKE '%CLT%' and column LIKE '%ID' and
4  checktype( "column" ) in ( CHAR, VARCHAR, INTEGER,
   SMALLINT ) and
5  int(right( char(value), 4) ) > 10
6  ORDER BY "table", "column" desc;
```

In line 1, the SELECT clause is indicated and will limit the query to the columns TABLE, column, UROWID, and VALUE. Line 2 indicates the FROM clause, and indicates the DATA_DISCOVERY.FAS_DD virtual table, having a table definition as set forth above. Line 3 indicates the beginning of the WHERE clause, and indicates that the table names should be limited to those that have "CLT" in the title (% being wild cards on each side of "CLT") and column names limited to those that end in ID (% as wild card before ID). Line 4 indicates that columns of the type CHAR, VARCHAR, INTEGER, and SMALLINT should be returned. Line 5 indicates that values for which the rightmost four characters converted into integers will be greater than 10. Line 6 indicates that the results will first be ORDERED BY table (ascending as default), and then by column (descending).

A second example is the SQL query:

```
1  SELECT *
2  FROM DATA_DISCOVERY.FAS_DD
3  WHERE int( substr( char("value"), 2, 3 ) ) between 100 and 300;
```

Figure 13:
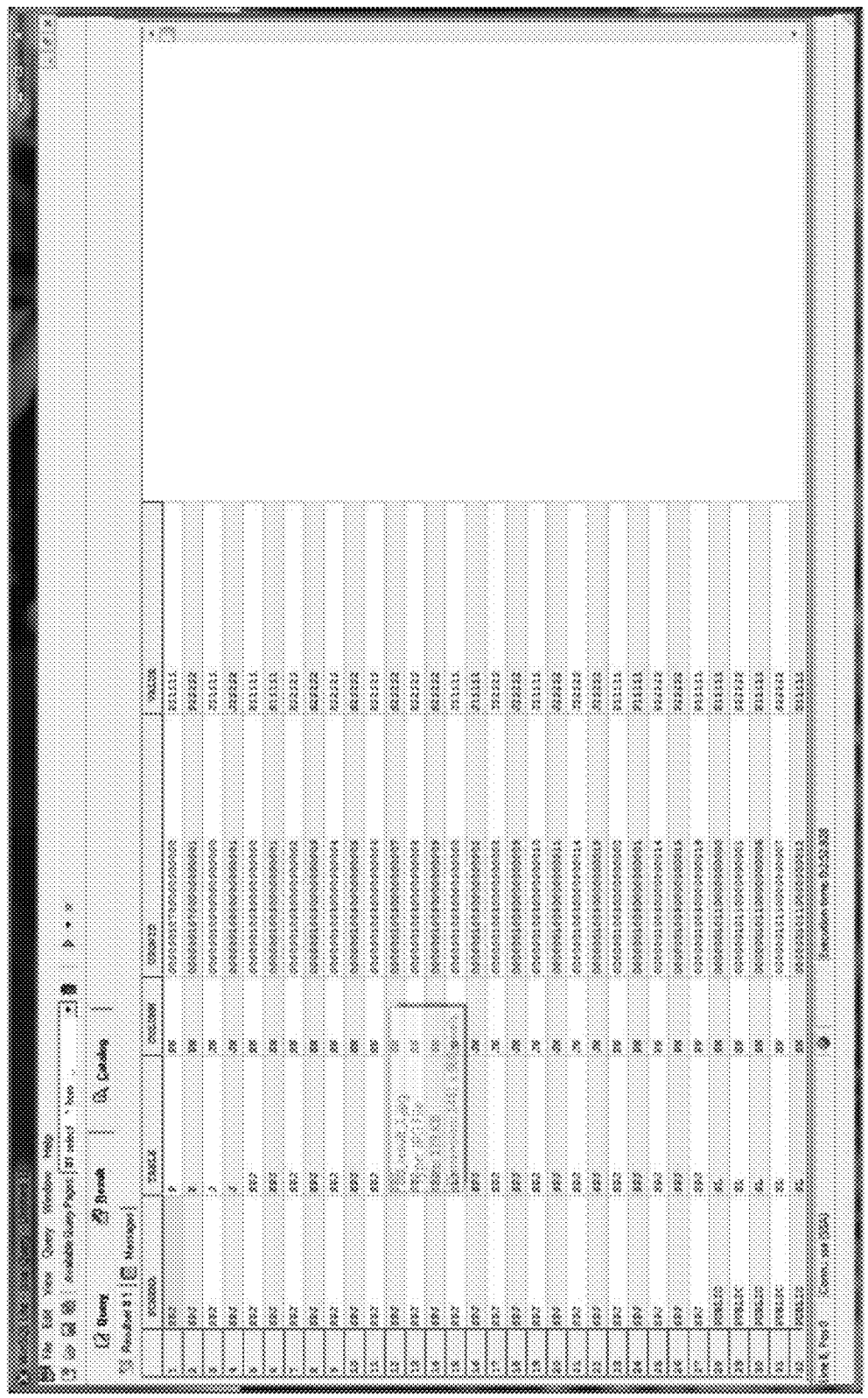
FIG. 13 is a user interface showing results of the query of FIG. 13 according to one embodiment.

In this example, all columns are selected (*), the DATA_DISCOVERY.FAS_DD virtual table is specified as above, and the data returned should be limited to integers with a value between 100 and 300 based on three (3) characters starting at the second (2) character in the value. The results that are returned by the result processing module 1190 after step 1260 for this example are shown in FIG. 13. Note that in the VALUE column, each value fits the above constraints, namely that starting with the second character, the next three characters have a value between 100 and 300. E.g., for row 1 value P<u>111</u>11 the value (underlined) is 111, for row 2, value P<u>222</u>22, the value (underlined) is 222, etc.

Referring again to FIG. 12, the query received 1220 is next translated 1230 into a set of data model queries. This step is performed by query translation module 1185 according to one embodiment. The data model queries are generated based on the search parameters specified in the WHERE clause, type checks (if any), and the underlying data model as specified by the definition of the virtual table. These queries rely upon the inter-relationship between domains and columns, as described elsewhere herein.

More specifically, a given search request is first parsed such that its constraints are classified into two groups: search expressions and data model scope. Search expressions are the constraints applied to the VALUE column of the virtual table DATA_DISCOVERY.FAS_DD. The data model scope includes the constraints applied to the SCHEMA_NAME, TABLE_NAME, OR COLUMN_NAME columns of the virtual table. Next, the search scope is defined. The search expression is evaluated to identify potential data type constraints for search pruning. For example, if the constant is of the type "Alpha Numeric," which could not be translated into a Numeric or Date/Time data type, it is possible to eliminate from the search scope any Numerical or Date/Time domain/column data type. Continuing the search scope definition, the data model scope constraints, in conjunction with the data type constraint noted above, are applied to the data model to define the scope of the search. A look up request is executed on the system catalog to identify each potential column to analyze:

```
SELECT Schema_Name, Table_Name, Column_Name,
    Domain_Name, DataType
FROM Systems.Columns
WHERE
    Schema_Name Constraint
    Table_Name Constraint
    Column_Name Constraint
    DataType Constraint
ORDER BY Domain_Name, Schema_Name, Table_Name,
    Column_Name
```

Next, the search request is executed:
For each Domain Di
Execute the search expression to select the list of unique values which qualify named

```
Di.ESV
    For Each Column Cj in Di
        Form a query in the form of
            INSERT INTO "Data_Discovery"."Fas_DD"
            ("Schema", "Table", "Column", "uRowId", "Value")
                SELECT 'Schema_Name', 'Table_Name',
                'Column_Name',
                RowId, Column_Name
                FROM Schema_Name.Table_Name
                WHERE Column_Name in Di.ESV
```

By way of example, assume the following table/column/domain structure:

```
Create Domain D1 Char(10);
Create Domain D2 Dec(6,0);
Create Domain D3 Char(6);
Create Table T1 (
    C1 D1,
    C2 D2);
Create Table T2 (
    CC1 D1,
    CC2 D3);
Create Table T3 (
    CCC1 D1,
    CCC2 D2,
    CCC3 D3);
```

FIG. 14 shows these three tables, i.e., T1, T2, and T3. The tables have been simplified to three rows each for purposes of this example.

In this example, the SQL query is:

```
1  SELECT *
2  FROM DATA_DISCOVERY.FAS_DD
3  WHERE VALUE LIKE '%10%';
```

Using this query, the data model queries that the received query is translated 1230 into are as follows:
SELECT Schema, Table, Column, UROWID, VALUE
FROM T1
WHERE C1 in (SELECT VALUE FROM D1 WHERE VALUE LIKE '%10%')
UNION All
SELECT Schema, Table, Column, UROWID, VALUE
FROM T2
WHERE CC1 in (SELECT VALUE FROM D1 WHERE VALUE LIKE '%10%')
UNION All
SELECT Schema, Table, Column, UROWID, VALUE
FROM T3
WHERE CCC1 in (SELECT VALUE FROM D1 WHERE VALUE LIKE '%10%')
UNION All
SELECT Schema, Table, Column, UROWID, VALUE
FROM T1

WHERE C2 in (SELECT VALUE FROM D2 WHERE VALUE=10)
UNION All
SELECT Schema, Table, Column, UROWID, VALUE FROM T3
WHERE CCC2 in (SELECT VALUE FROM D2 WHERE VALUE=10)
UNION All
SELECT Schema, Table, Column, UROWID, VALUE FROM T2
WHERE CCC2 in (SELECT VALUE FROM D3 WHERE VALUE LIKE '%10%')
UNION All
SELECT Schema, Table, Column, UROWID, VALUE FROM T3
WHERE CCC3 in (SELECT VALUE FROM D3 WHERE VALUE LIKE '%10%')

For D2, where the data is of type DEC (decimal), in the translation the value is stated as "=10" instead of "%10%" as used in the CHAR (character strings). The replicated sub-queries (shown in parentheses) for a specific domain are executed only once to produce an entity selection vector (ESV). The ESV is then used on each table specified in the WHERE clause including a column associated with the domain to produce a row selection vector (RSV), e.g., via the process described in conjunction with FIG. 8B. The data shown in FIG. 8B corresponds to Domain D1 from the above example.

The result set for this example (i.e., the result of step 1260) is shown in FIG. 15, and will be described in greater detail in conjunction with step 1260 below.

Once the received query is translated 1230 into data model queries, the data model is searched 1240 using the data model queries. According to one embodiment, the data model queries are provided 1245 as input into 602 of the search process as described in conjunction with FIG. 6. In this embodiment, the search modules 1130 provide the search functionality as described elsewhere herein. In this embodiment, the search is processed as in FIG. 6, and then results of the search are received 1250 from the search process.

Finally, the results of the data model queries are processed 1260 to produce a result set. This step is performed by result processing module 1190 according to one embodiment. One such result set was shown in FIG. 13, described above. In addition, the result set for the data model queries shown above is shown in FIG. 15. That result set has five columns: SCHEMA, TABLE, COLUMN, UROWID, and VALUE. Recall from the example that the parameter specified was WHERE "VALUE LIKE '%10%'." Each row in the result set thus has a value that includes the digits 10 in it, in any location for D1 and D3 (character strings) and value equal to 10 for D2 (decimal). Thus, the result set shown in FIG. 15 provides the SCHEMA, TABLE, COLUMN, UROWID, and VALUE for each value from T1, T2, and T3 that met the parameter "%10%" (D1 and D3) or "=10" (D2).

Domain-Based Keyword Searching

The search process described above enables keyword searching of data in the database 106 without requiring the creation or the use of search indices. In the database context, a keyword search allows a user to search the database by providing only a plain text search string. The user does not specify in the search string the specific tables or columns in the database where the search should be conducted. In fact, the user may not have any knowledge of the underlying database schema. A keyword search performed on a database identifies the rows in the database 106 that contain data relevant to the search string provided by the user. Once the search results are filtered for accuracy, the data in the rows identified by the filtered search results are presented to the user.

In operation, the search string provided by the user is processed to generate a set of search string permutations. Each string permutation specifies a different permutation of the keywords included in the search string query. Further, each string permutation is database agnostic such that the string permutation does not specify any information related to the structure of the database and is not set forth in a data manipulation language. The search process described above in conjunction with FIG. 2 and FIG. 6 is then executed asynchronously for each string permutation. Each asynchronous execution generates a search result set that identifies rows in the database that include data relevant to the string permutation. Each search result is scored based on (i) the similarity between the string permutation and the search string provided by the user or process and (referred to herein as the "string similarity score") (ii) the relevance between the individual result and the string permutation (referred to herein as the "permutation result relevance score"). The results are ranked according to computed scores, and the rankings determine which of the results are to be presented.

Figure 16:
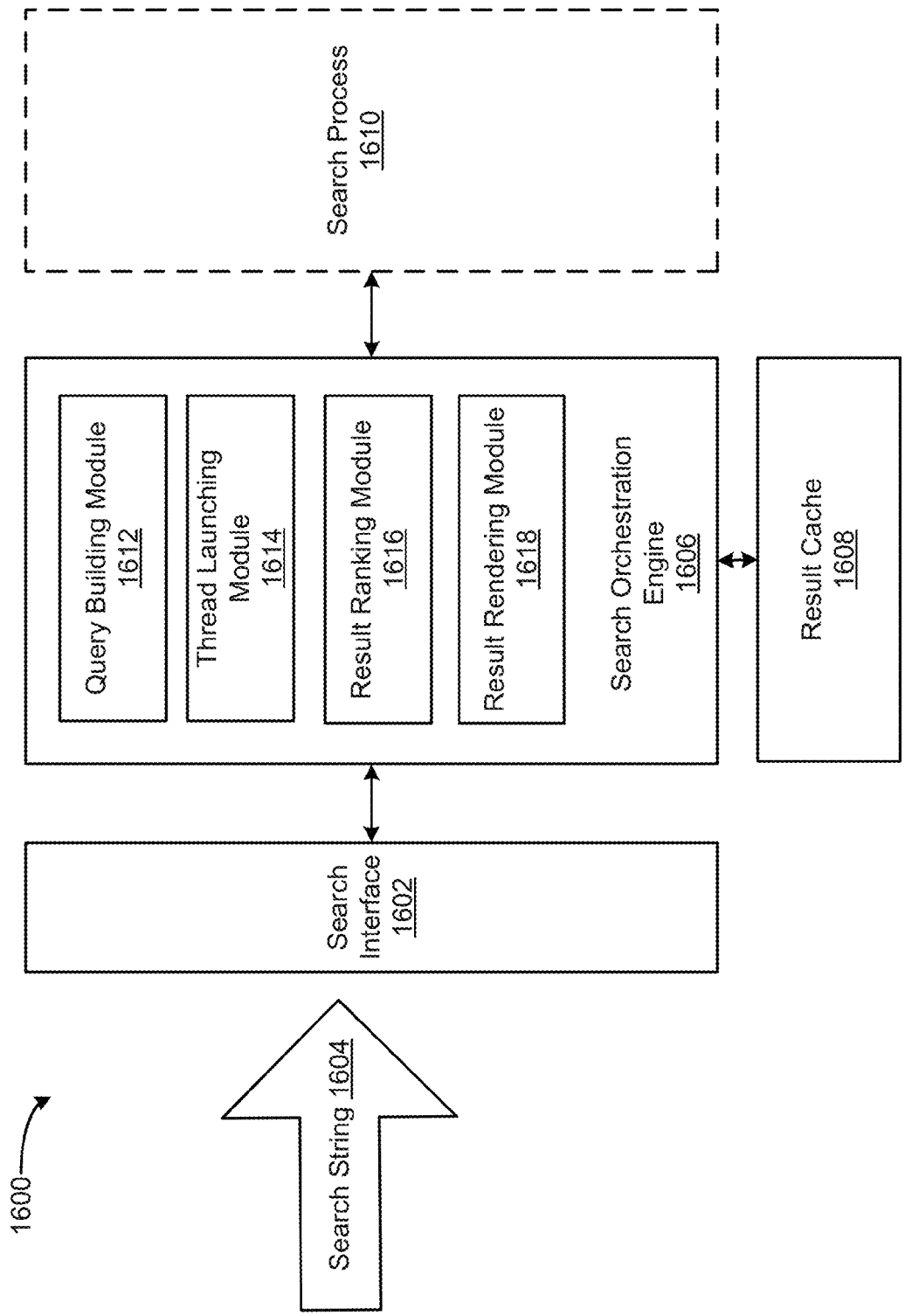
FIG. 16 is a block diagram of a database keyword searching system 1600 according to one embodiment.

FIG. 16 is a block diagram of a database keyword searching system 1600 according to one embodiment. As shown, 1600 includes a search interface 1602, a search orchestration engine 1606, and a result cache 1608.

The search interface 1602 is a user interface configured to receive as input search queries, such as search string 1604, and to display the results generated from processing the search queries, and is one means for performing this function. In operation, the search interface 1602 enables a user to provide a search string in the form of a textual search string. The search interface 1602 then transmits the search string to the search orchestration engine 1606 for processing. The search interface 1602 receives results generated from the processing from the search orchestration engine 1606 and displays the results to the user. In one embodiment, the search orchestration engine 1606 continuously pushes results generated from processing a search string to the search interface 1602 for display. In an alternate embodiment, the search interface 1602 continuously polls the search orchestration engine 1606 to determine whether any new results are available for display. The search interface 1602 may be a graphical user interface or a text based user interface.

The search orchestration engine 1606 is configured to receive search strings from the search interface 1602 and orchestrate the execution of database search queries to generate search results associated with the search queries, and is one means for performing this function. Upon receiving a search string, the search orchestration engine 1606 generates multiple string permutations associated with the search string. Each string permutation includes at least a subset of keywords included in the search string. The search orchestration engine 1606 launches a different thread for executing the search process 1610 described in FIG. 6 for each string permutation. Each thread execution generates search results relevant to the search string. The threads execute asynchronously such that the search orchestration engine 1606 receives search results as each thread completes execution.

The search orchestration engine 1606 maintains a list of search results that are ordered based on the relevancy between the search results and the search string. At any given time, the search orchestration engine 1606 transmits one or more of the search results to the search interface 1602 for display. In addition, the ordered search results maintained by the search orchestration engine 1606 are temporarily stored in the result cache 1608. If the same search string is received by the search orchestration engine 1606 within the lifetime of the result cache 1608, then the results are retrieved from the result cache 1608 for transmission to the search interface 1602 without performing the search process again.

The search orchestration engine 1606 includes a query building module 1612, a thread launching module 1614, a result ranking module 1616, and a result rendering module 1618. The functional details of each of these modules are described below in conjunction with FIG. 17.

Figure 17:
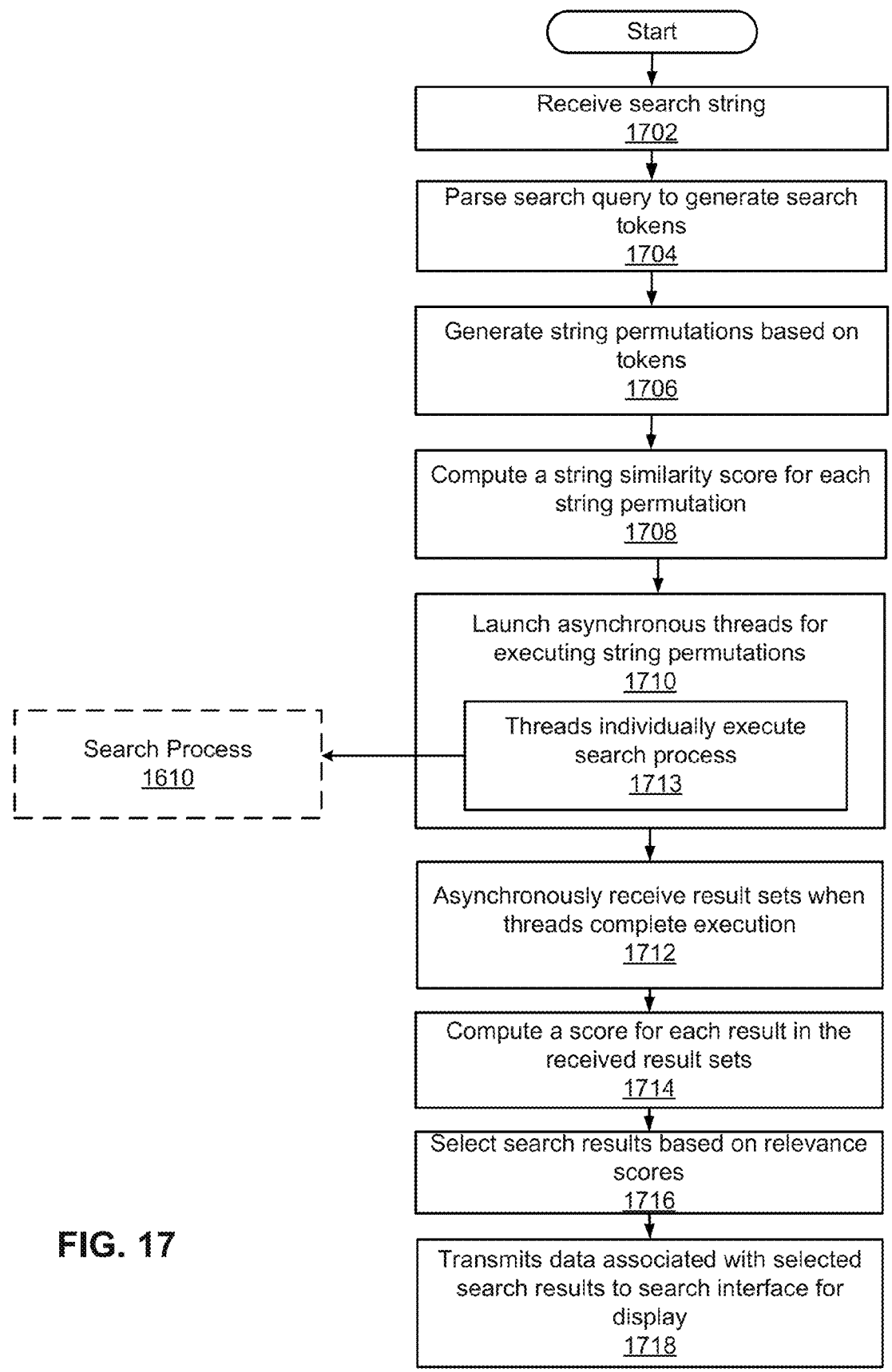
FIG. 17 is a flow diagram illustrating steps of a method for performing a database keyword search according to one embodiment.

FIG. 17 is a flow diagram illustrating steps of a method for performing a database keyword search according to one embodiment. The steps may be performed, for example, by the various modules within the orchestration engine 1606. In some implementations, the steps are performed in an order other than the order presented in FIG. 17, and in other implementations, additional or alternative steps may be performed.

The method begins by the query building module 1612 receiving 1702 a search string from the search interface 1602. The search string is a set of plain language keywords provided by a user for performing a search on the database 106. An example of a search string provided by a user is "Carl's Nordstrom order on Dec. 22, 2013." The search string does not specify which tables in the database 106 to perform the search. Further, the words included in the search string are not explicitly tied to particular columns in the database 106.

The query building module 1612 parses 1704 the search string to generate search tokens. The tokenization process is language specific and, among other things, filters out connector words, punctuation, and whitespace from the search string and breaks the filtered search string into meaningful elements, i.e., the search tokens. The search tokens may be individual words or groups of words in the search string. Any known technique for tokenizing textual content may be used by the query building module 1612 during the tokenization process. For the search string shown above, the query building module 1612 may generate the following search tokens: "Carl," "Nordstrom," "order," and "Dec. 22, 2013." Further, each token may be assigned a weight based on where the token appears in the search string.

Based on the search tokens, the query building module 1612 generates 1706 a set of string permutations that each includes at least a subset of the search tokens. Two different string permutations may include the same search tokens that are ordered differently. Continuing the example above, the query building module 1612 may generate at least the following string permutations: "'Carl' and 'Dec. 22, 2013,'" "'Nordstrom' and 'order' and 'Dec. 22, 2013,'" and "'order,' 'Carl,' 'Nordstrom.'"

Once the string permutations are generated, the query building module 1612 computes 1708 a string similarity score associated with each string permutation that indicates the similarity between the string permutation and the original search string. When computing the string similarity score associated with a given string permutation, the query building module 1612 takes into account the individual tokens that are included in the string permutation, the order of the tokens relative to the order of words in the search string, and the weights associated with the tokens. In one embodiment, the query building module 1612 computes the string similarity score based on the following equation:

$$S(x) = \sum_{i=1}^{n}\left\{\sum_{i=1}^{n}(W_i) * f(T_i)\right\}$$

where $S(x)$ is the string similarity score, n is the number of tokens in the search string, $W_i$ is the weight associated with each token at a given position i, $T_i$ is the search token at position i, and $f(T_i)$ is the function which returns a value of 1 if the token present at position i has an associated weight.

The thread launching module 1614 launches 1710 a different thread for executing each string permutation generated and scored by the query building module 1612. Each thread is configured to store the corresponding string permutation, the string similarity score associated with the corresponding string permutation, an identifier associated with the search string provided by the user, and a callback location specifying where the thread should return after execution is complete. The threads individually execute 1713 the domain-based search process described above in conjunction with FIG. 6. For each thread, the execution of the search process generates a result set that includes one or more search results. Each search result is a row-table pair that identifies a particular row in the database 106 that stores data relevant to the string permutation associated with the thread. A search result does not include the actual data.

The result ranking module 1616 asynchronously receives 1712 result sets when the threads complete execution. In operation, when a given thread completes execution, the thread returns the result set generated from executing the search process to the callback location stored in the thread. Along with the result set, the thread returns the corresponding string permutation, the string similarity score, and the search identifier associated with the search string to the callback location. In one embodiment, the callback location is a buffer maintained by the result ranking module 1616. Since the threads execute asynchronously, the result sets from the threads may be received at different times. The result ranking module 1616 does not wait for all the threads to complete execution before processing a result set that has been received.

For a received result set, the result ranking module 1616 computes 1714 a result relevance score for each search result in the result set. The result relevance score is computed as a combination of the string similarity score associated with the string permutation and a permutation result relevance score that indicates the relevance between the specific result and the string permutation. In one embodiment, the result ranking module 1616 combines the string similarity score and the permutation result relevance score to generate the result relevance score using the following function:

$$\text{result\_relevance} = S(x) + P(x)$$

$$S(x) = \sum_{i=1}^{n}\left\{\sum_{i=1}^{n}(W_i) * f(T_i)\right\}$$

$$P(x) = \sum_{i=1}^{n} O(T_i)$$

where $S(x)$ is the string similarity score, $P(x)$ is the permutation result relevancy score, $O(T_i)$ is the frequency of occurrence of the tokens in the returned result column value, $f(T_i)$ is the function that returns a value of 1 if the token present at position i has an associated weight associated, and result_relevance is the result relevance score of a result.

The result ranking module 1616 maintains a queue associated with the search identifier. The queue stores the search results that are ordered based on their respective result relevance scores. When a new search result is scored, the result ranking module 1616 inserts the search result in the queue. The location of the search result in the queue is determined based on its result relevance score. In one embodiment, the result ranking module 1616 performs a binary search to determine the location in the queue into which a particular search result should be inserted.

The result ranking module 1616 selects 1716 search results to be displayed in the search interface 1602 based on the result relevance scores associated with the search results. In one embodiment, the result ranking module 1616 selects the top N search results in the queue for display, where N is a configurable value. Specifically, if, upon inserting a search result into the queue, the top N search results in the queue change, then the result ranking module 1616 selects the new search results in the top N for display. Once the search results are selected, the result ranking module 1616 notifies the result rendering module 1618 of the selected search results.

The result rendering module 1618 transmits 1718 data associated with the selected search results to the search interface 1602 for display. In operation, the result rendering module 1618 reads from the database 106 the data in the row identified by the row-table pair included in each search result selected by the result ranking module 1616. In one embodiment, the result rendering module 1618 identifies search specific configurations associated with the user who provided the search string. Search specific configurations include but are not limited to the number of search results to be displayed, the specific data columns to be displayed, and the order of displaying the data columns. If such search specific configurations are available, then the result rendering module 1618 filters the data read from the database 106 according to the configurations. The data is then transmitted to the search interface 1602 for display to the user who provided the search string.

Steps 1714-1716 are performed repeatedly as new result sets are returned by threads that have completed execution. Therefore, the search results that are available for display on the search interface 1602 may be updated frequently based on the most recently received result set. As discussed above, the search interface 1602 may request additional search results from the result rendering module 1618 based on user input. In response to such a request, the result rendering module 1618 performs step 1718 so that any new search results may be transmitted to the search interface 1602 for display. Alternatively, the result rendering module 1618 transmits to the search interface 1602 any new search results that were not previously transmitted for display.

Example of Domain-Based Keyword Searching

For the following example, assume that database 106 includes the following tables.

TABLE 1

Customer Table

| UROWID | First_Name | Last_Name |
|--------|------------|-----------|
| C0001  | Hilary     | Bennett   |
| C0002  | Alex       | Blake     |

TABLE 1-continued

Customer Table

| UROWID | First_Name | Last_Name |
|--------|------------|-----------|
| C0003  | John       | Carter    |
| C0004  | Richard    | Clark     |

TABLE 2

Store Table

| UROWID | Name      | State |
|--------|-----------|-------|
| S0001  | Nordstrom | NY    |
| S0002  | Martin's  | WA    |
| S0003  | Sudbury's | IL    |
| S0004  | Bristol   | OH    |

TABLE 3

Purchase Invoices

| UROWID | Name             | Value |
|--------|------------------|-------|
| P0001  | John Nordstrom   | 1000  |
| P0002  | Richard Martin's | 1350  |
| P0003  | Alex Sudbury's   | 2500  |
| P0004  | John Bristol     | 3000  |

For the purposes of this example, assume that the query building module 1612 receives the search string "John Nordstrom." In response to receiving the search string, the query building module 1612 parses the search string and generates the search tokens "John" and "Nordstrom." The query building module 1612 then generates a set of string permutations that each includes at least one of the tokens. Consequently, the following string permutations are generated with the search tokens "John" and "Nordstrom": "John Nordstrom," "Nordstrom John," "Nordstrom," and "John."

The query building module 1612 computes a string similarity score for each of the string permutations. The string similarity scores are computed based on scores assigned to each of the search tokens and the locations in which the tokens appear. Each of the search tokens is assigned a score of "100" when the search token appears in the location matching its location in the original search string. Conversely, each of the search tokens is assigned a score of "50" when the search token appears in a different location from its location in the original search string. Consequently, the string permutations have the following string similarity scores: "John Nordstrom"=200, "Nordstrom John"=100, "Nordstrom"=50 and "John"=100.

Next, the thread launching module 1614 launches a different thread for executing each string permutation generated and scored by the query building module. The result ranking module 1616 computes permutation result relevance scores for each result received from the execution of the string permutations. For each result, the result ranking module 1616 computes the permutation result relevance score as the string similarity score of the string permutation plus a score of "10" for each occurrence of a search token in the result. The result ranking module 1616 ranks the search results according to their permutation result relevance scores. Table 4 shows the ranked search results based on Table 1, Table 2, and Table 3.

TABLE 4

Ranked Search Results

| UROWID | SCORE |
|---|---|
| P0001 | 220 |
| C0003 | 60 |
| S0001 | 60 |

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the present invention.

What is claimed is:

1. A computer-implemented method of performing a keyword search on a database by a computer processor, the method comprising:
   receiving a request including a search string for searching the database;
   parsing the search string to identify a plurality of keywords included in the search string;
   generating a plurality of string permutations based on the received search string, each string permutation being database agnostic and including at least a subset of the plurality of keywords included in the received search string, the plurality of string permutations including two string permutations each comprising different orderings of a same subset of the plurality of keywords;
   for each string permutation:
   determining a string similarity score between the string permutation and the search string based on which keywords are included in the string permutation and an order of keywords in the string permutation relative to an order of the keywords in the search string;
   launching an asynchronous thread for executing a search on the data in the database based on the string permutation;
   receiving a plurality of search results when the thread completes execution of the search, each search result identifying a row in the database that includes data relevant to the string permutation:
   determining a result relevance score associated with each search result by combining the string similarity score for the string permutation and a permutation result relevance score included with the search result, the permutation result relevance score measuring relevance between the string permutation and the data relevant to the string permutation; and collecting the plurality of search results in an ordered queue, the ordering of the search results based on the result relevance score associated with each search result; and retrieving data from rows in the database identified by a subset of the search results collected in the ordered queue for display in response to the request.

2. The method of claim 1, wherein determining the string similarity score comprises:

determining a weight associated with a keyword included in the string permutation based on whether the keyword has a same location in the string permutation as it does in the search string; and adding the determined weight for the keyword into the string similarity score.

3. The method of claim 1, wherein the subset of the search results comprise one or more search results included in a first plurality of search results received when a first thread completes the execution of the search, and the subset of the search results are selected before a second thread has completed the execution of the search.

4. The method of claim 3, wherein one or more search results included in a second plurality of search results received when the second thread completes the execution are selected for display after data from rows identified by the subset of the search results is displayed.

5. The method of claim 1, wherein the subset of the search results comprises a top threshold number of search results in the ordered queue.

6. The method of claim 1, further comprising:

storing the ordered queue in a cache;

receiving a second request comprising the search string for searching the database; and retrieving data from rows in the database identified by a second subset of the search results collected in the ordered queue for display in response to the request.

7. The method of claim 1, wherein each of the plurality of string permutations is a unique permutation of the plurality of keywords in the search string.

8. The method of claim 1, wherein launching the asynchronous thread for executing the search comprises:

accessing a virtual table definition that is a view into a data model of the database represented in a domain structure;

translating the string permutation into a set of data model queries for searching the data model using the virtual table definition; and searching the data stored in the database based on the set of data model queries to produce the plurality of search results.

9. The method of claim 8, wherein the data in the database is represented by one or more tokenized data segments, each tokenized data segment being associated with a different set of columns included in the database and specifying all unique values in the set of columns.

10. A computer program product having a non-transitory computer readable storage medium storing executable code for performing a keyword search on a database, the code when executed performs steps comprising:

receiving a request including a search string for searching the database;

parsing the search string to identify a plurality of keywords included in the search string;

generating a plurality of string permutations based on the received search string, each string permutation being database agnostic and including at least a subset of the plurality of keywords included in the received search string, the plurality of string permutations including two string permutations each comprising different orderings of a same subset of the plurality of keywords;

for each string permutation:

determining a string similarity score between the string permutation and the search string based on which keywords are included in the string permutation and an order of keywords in the string permutation relative to an order of the keywords in the search string;

launching an asynchronous thread for executing a search on the data in the database based on the string permutation;

receiving a plurality of search results when the thread completes execution of the search, each search result identifying a row in the database that includes data relevant to the string permutation;

determining a result relevance score associated with each search result by combining the string similarity score for the string permutation and a permutation result relevance score included with the search result, the permutation result relevance score measuring relevance between the string permutation and the data relevant to the string permutation; and collecting the plurality of search results in an ordered queue, the ordering of the search results based on the result relevance score associated with each search result; and retrieving data from rows in the database identified by a subset of the search results collected in the ordered queue for display in response to the request.

11. The computer program product of claim 10, wherein determining the string similarity score comprises:

determining a weight associated with a keyword included in the string permutation based on whether the keyword has a same location in the string permutation as it does in the search string; and adding the determined weight for the keyword into the string similarity score.

12. The computer program product of claim 10, wherein the subset of the search results comprise one or more search results included in a first plurality of search results received when a first thread completes the execution of the search, and the subset of the search results are selected before a second thread has completed the execution of the search.

13. The computer program product of claim 12, wherein one or more search results included in a second plurality of search results received when the second thread completes the execution are selected for display after data from rows identified by the subset of the search results is displayed.

14. The computer program product of claim 10, wherein the subset of the search results comprises a top threshold number of search results in the ordered queue.

15. The computer program product of claim 10, further comprising:

storing the ordered queue in a cache;

receiving a second request comprising the query for searching the database; and retrieving data from rows in the database identified by a second subset of the search results collected in the ordered queue for display in response to the request.

16. The computer program product of claim 10, wherein each of the plurality of string permutations is a unique permutation of the plurality of keywords in the search string.

17. The computer program product of claim 10, wherein launching the asynchronous thread for executing the search comprises:
- accessing a virtual table definition that is a view into a data model of the database represented in a domain structure;
- translating the string permutation into a set of data model queries for searching the data model using the virtual table definition; and
- searching the data stored in the database based on the set of data model queries to produce the plurality of search results.

18. The computer program product of claim 17, wherein the data in the database is represented by one or more tokenized data segments, each tokenized data segment being associated with a different set of columns included in the database and specifying all unique values in the set of columns.

19. A computer system, comprising:
- a database, wherein data in the database is represented by one or more tokenized data segments, each tokenized data segment being associated with a different set of columns included in the database and specifying all unique values in the set of columns; and
- a search orchestration engine executing on a computer processor and configured to:
- receive a request including a search string for searching the database, the received query comprising a plurality of keywords;
- generate a plurality of string permutations based on the received search string, each string permutation being database agnostic and including at least a subset of the plurality of keywords included in the received search string, the plurality of string permutations including two string permutations each comprising different orderings of a same subset of the plurality of keywords;
- for each string permutation:
  - determine a string similarity score between the string permutation and the search string based on which keywords are included in the string permutation and an order of keywords in the string permutation relative to an order of the keywords in the search string;
- launch an asynchronous thread for executing a search on the one or more compressed tokenized data segments based on the string permutation;
- receive a plurality of search results when the thread completes execution of the search, each search result identifying a row in the database that includes data relevant to the string permutation:
- determine a result relevance score associated with each search result by combining the string similarity score for the string permutation and a permutation result relevance score included with the search result, the permutation result relevance score measuring relevance between the string permutation and the data relevant to the string permutation; and
- collect the plurality of search results in an ordered queue, the ordering of the search results based on the result relevance score associated with each search result; and
- retrieve data from rows in the database identified by a subset of the search results collected in the ordered queue for display in response to the request.

20. The computer system of claim 19, wherein launching the asynchronous thread for executing the search comprises:
- accessing a virtual table definition that is a view into a data model of the database represented in a domain structure;
- translating the string permutation into a set of data model queries for searching the data model using the virtual table definition; and
- searching the one or more compressed tokenized data segments stored in the data model based on the set of data model queries to produce the plurality of search results.

* * * * *